United States Patent [19]

Walker et al.

[11] Patent Number: 5,565,139

[45] Date of Patent: Oct. 15, 1996

[54] GEL-BASED VAPOR EXTRACTOR AND METHODS

[75] Inventors: David H. Walker, Winchester; Harris Gold, Lexington; George W. McKinney, III, Chestnut Hill; John F. McCoy, III, North Chelmsford; Xiaohong Yu, Boston, all of Mass.

[73] Assignee: Gel Sciences, Inc., Bedford, Mass.

[21] Appl. No.: 459,307

[22] Filed: Jun. 2, 1995

Related U.S. Application Data

[62] Division of Ser. No. 168,723, Dec. 15, 1993.

[51] Int. Cl.[6] .......................... B01D 53/06; B01D 53/08; B01D 53/26
[52] U.S. Cl. .......................... 252/194; 96/118; 96/119; 96/120; 96/125; 502/401; 502/402
[58] Field of Search ........................ 252/194; 502/401, 502/402; 96/118, 119, 120, 125

[56] References Cited

U.S. PATENT DOCUMENTS

| | | |
|---|---|---|
| 2,738,857 | 3/1956 | Drew . |
| 3,140,936 | 7/1964 | Schwartz . |
| 3,204,388 | 9/1965 | Asker et al. . |
| 3,338,032 | 8/1967 | Siewert et al. . |
| 4,160,731 | 7/1979 | Doyle . |
| 4,683,258 | 7/1987 | Itoh et al. . |
| 4,729,774 | 3/1988 | Cohen et al. . |
| 4,732,930 | 3/1988 | Tanaka et al. . |
| 5,100,933 | 3/1992 | Tanaka et al. . |
| 5,170,633 | 12/1992 | Kaplan . |
| 5,403,893 | 11/1993 | Tanaka et al. . |

FOREIGN PATENT DOCUMENTS 4-243516  1/1993  Japan .

OTHER PUBLICATIONS

CA 112:99759 Macromolecules (1990) vol. 23, No. 5, pp. 1517–1519.
Mamada et al., "Photoinduced Phase Transition of Gels", Macromolecules, 23(5), 1517–19, Abstract No. 112:99759 (1990).
Mamada et al., "Polymer Gels Showing Reversible Discontinous Photoinduced Volume Changes," p. 23, Abstract No. 115: 93806 (1990).
Li et al., "Study on the Synthesis and Properties of Macroreticular", 3(8), pp. 619–620, Abstract No. 118:214082 (1992).
Kolarz, "Interpentrating Polymer Network", vol. 2, pp. 166–170, Abstract No. 92: 42722 (1990).

*Primary Examiner*—Sharon Gibson
*Assistant Examiner*—Valerie D. Fee
*Attorney, Agent, or Firm*—Choate, Hall & Stewart

[57] ABSTRACT

A vapor extraction apparatus includes a gel sorbent capable of absorbing vapor directly into the liquid state and capable of disgorging the absorbed liquid in a phase-transition. The apparatus includes a housing adapted for movement from a first position, where it is exposed to a vapor-containing gas stream and a first environmental condition, and capable of moving to a second position, where it is exposed to a second environmental condition. A gel sorbent is disposed on at least one surface of the housing. The gel sorbs vapor from the gas stream as liquid when the sorbent is in its first position. The sorbent disgorges the liquid during phase-transition collapse when it is in the second position. A method of extracting vapor from a process gas stream includes contacting a phase transition gel sorbent with vapor under conditions sufficient for the gel sorbent to undergo a phase transition and absorb vapor as liquid inside the gel sorbent. The gel sorbent is then exposed to conditions sufficient for it to undergo a phase transition and disgorge the liquid from inside the gel sorbent. The disgorged liquid is removed from the gel sorbent.

18 Claims, 9 Drawing Sheets

GEL-BASED VAPOR EXTRACTOR AND METHODS

This is a divisional of copending application Ser. No. 08/168,723 filed on Dec. 15, 1993, now pending.

BACKGROUND OF THE INVENTION

Extraction of water vapor from gas streams is a critically important component of many process applications. For example, removal of water vapor is essential in corrosion prevention since many of the chemical reactions are catalyzed and accelerated by moisture. The prevention of the condensation in water treatment plants, ice rinks and refrigerated warehouses is another application that requires vapor extraction. The prevention of mold and/or fungal growth on, or within, archival materials, seeds, and foods is another important application in which water vapor extraction is required.

There are several ways to remove vapor, particularly water vapor, from a gas stream. One method is to cool the gas stream to condense the vapor. When air is cooled below its dewpoint temperature, moisture condenses on the nearest surface. The air is thus dehumidified by the process of cooling and condensation. Most commercial and residential air conditioning systems operate under this principle. Typically, a refrigeration system cools air, drains some of its moisture as condensate, and sends the drier air back to a space to be cooled. The system essentially pumps the heat from the dehumidified air to a different air system in another location, by using refrigerated gas to carry the heat.

Alternatively, one may present a desiccant to the gas stream, which pulls water vapor out of the gas stream through differences in vapor pressures. Desiccant dehumidifiers, instead of cooling the air to condense its moisture, attract moisture from the air by creating an area of low vapor pressure at the surface of the desiccant. The pressure exerted by the vapor in the air is higher, so the vapor molecules move from the air to the desiccant and the air is dehumidified.

Desiccant dehumidifiers make use of changing vapor pressures relative to dry air in a repeating cycle described by the simplified diagram of FIG. 1, showing desiccant moisture content on the x-axis plotted against desiccant surface vapor pressure on the y-axis. The family of curves in the Figure describes the behavior of the desiccant at different desiccant temperatures. The desiccant begins the cycle at Point 1. Its surface vapor pressure is low because it is dry and cool. As the desiccant picks up moisture from the surrounding air, the desiccant surface changes to the condition described by Point 2. Its vapor pressure is now equal to that of the surrounding air because the desiccant is moist and warm. At Point 2, the desiccant cannot collect more moisture because there is no vapor pressure difference between the desiccant surface and the vapor in the air.

Then the desiccant is taken out of the moist air, heated, and placed into a different air system. The desiccant surface vapor pressure is now very high, higher than the surrounding air, so moisture moves off the desiccant surface into the air to equalize the pressure differential. At Point 3, the desiccant is dry, but since it is also hot, its vapor pressure is still too high to collect moisture from the air. To restore its low vapor pressure, the desiccant is then cooled, returning it to Point 1 in the diagram and completing the cycle so that it can collect moisture again.

The desiccant cycle is driven by thermal energy. In the process of converting vapor in the gas to liquid in the desiccant, the vapor gives up its latent heat to the dehumidified air stream. The air exiting the desiccant is therefore warmed and must be cooled to return it to its original temperature. The desiccant also must be regenerated to remove the collected moisture and this is accomplished by driving off the liquid trapped in the desiccant through heating and re-evaporation. Normally, heated air is used for this process. The heat is provided by heat exchange with heated air warmed by an auxiliary heater. The moisture driven off from the desiccant is carried off in the regeneration air stream. The amount of heat needed for this process is substantial and regeneration of the desiccant must be done at elevated temperatures ranging from 150° to 275° F. (see FIG. 1).

As a result of this heating during regeneration, and the heat generated in going from the vapor to liquid state during the extraction of vapor, the desiccant itself is heated and a significant amount of heat is carried back over to the dehumidification process (Point 1 in FIG. 1). This carry-over heat is problematic in that the desiccant unit may not have cooled completely during its cooling cycle because residual heat is carried over into the new air stream. Heat carry-over greatly increases the amount of cooling needed for the conditioned air. Typical values of heat carry-over range from 60% to 200% of the latent load. Further, the air leaving the desiccant unit is both dry and hot and, in certain circumstances, must be cooled before being delivered to the point of use.

Recently, a gel-based dehumidifier has been proposed whose operation is based upon application of an electric field to a porous water-based polymer gel electrolyte. See, Japanese Patent Application 243516, Aug. 31, 1992, Fujitsu Inc. Application of an electric field between two electrodes to a water-based system leads to unwanted, and possibly dangerous, electrochemical reactions involving the water.

SUMMARY OF THE INVENTION

The present invention is a gel-based vapor extraction apparatus and method that is significantly more efficient than conventional desiccant-based vapor extraction designs and considerably safer than previous gel-based designs.

An apparatus for extracting vapor from a gas stream includes a gel sorbent capable of sorption of said vapor into liquid when exposed to a first environmental condition and capable of disgorging said liquid when exposed to a second environmental condition. Preferably, the gel sorbent is moved by way of a housing adapted for movement from a first position, where it is exposed to a gas stream and to a first environmental condition, and then to a second position, where it is exposed to a second environmental condition. The apparatus also includes a device for causing relative movement of the gel sorbent and the environmental conditions, so that the gel sorbent is exposed to the first and second environmental conditions. In one embodiment, the first environmental condition allows for sorption of the vapor and swelling of the gel sorbent and the second environmental condition causes the gel sorbent to collapse.

A gel sorbent may include a sorptive component that deliquesces in combination with a phase-transition component capable of collapsing in a discontinuous or continuous phase-transition. Preferred sorptive components include at least one polymer that exhibits a capacity to absorb at least 50 percent of its weight as liquid. A particularly preferred sorptive component is poly(methacrylamidopropyl-methoammoniumchloride). The phase-transition component can be an interpenetrating network of two or more polymers whose phase-transition is initiated by a change, relative to the first environmental condition, in at least one of temperature, pH, solvent concentration and ion concentration. The invention also pertains to a gel sorbent for a dehumidification apparatus, comprising a gel characterized by an ability to sorb vapor as liquid when the gel sorbent is exposed to a first environmental condition at a first position and characterized by an ability to collapse in a phase-transition and disgorge the liquid when the gel sorbent is exposed to a second environmental condition at a second position. The gel sorbent may further comprise a housing supporting the gel sorbent and adapted for movement from a first position, where it is exposed to a gas stream and a first environmental condition, and then to a second position, where it is exposed to at least a second environmental condition. In certain embodiments, the housing is a thin disk having perforations defined in it for holding the gel sorbent. In another embodiment, the housing can be a disk having many gel sorbent-lined cells defined in it that are arranged in a honeycomb configuration.

The gel sorbent may include a sorbent component and a phase-transition component. In certain embodiments, the phase-transition component comprises a network of two or more polymers. In another embodiment, the sorbent component and the phase-transition component are co-polymers. The sorbent component and phase-transition component may also form an interpenetrating network. Further, the phase-transition component itself may be an interpenetrating network of two or more polymers. Preferably, the gel sorbent is a desiccant adapted to extract water vapor.

A dual function gel vapor extraction apparatus is also encompassed within the scope of the invention. The apparatus includes a gel sorbent with the following characteristics: capable of adsorption of vapor as liquid at a low relative humidity condition; capable of absorption of vapor as liquid at a high relative humidity condition; and capable of phase-transition collapse. A phase-transition triggering means collapses the gel sorbent at high relative humidity, so that absorbed liquid is disgorged as liquid. A vaporization means evaporates any adsorbed liquid from the gel sorbent at low relative humidity, so that adsorbed liquid is disgorged as vapor. The apparatus also may include a device responsive to relative humidity for activating either or both of the phase-transition triggering means or vaporization means. Preferably, the apparatus further includes a housing supporting the gel sorbent and a means for moving the housing from a first position, where the vapor is sorbed, to a second position, where the liquid is disgorged as liquid, and optionally, to a third position, where the liquid is evaporated as vapor. A dual function apparatus of this invention has significant advantages in terms of reduced operating costs.

A method of the invention includes providing a gel sorbent that can sorb vapor as liquid and that can collapse in a phase-transition to disgorge the liquid. Next, the gel sorbent is exposed to conditions sufficient for the gel sorbent to undergo a phase-transition and disgorge liquid from the gel sorbent. The liquid is removed from the gel sorbent. Preferably, the gel sorbent is provided in a moveable housing that contains the gel sorbent and moves the gel sorbent between first and second environmental conditions, these conditions being sufficient for the gel sorbent to sorb vapor as liquid and then undergo a phase-transition and disgorge liquid from the gel sorbent.

DESCRIPTION OF THE PREFERRED EMBODIMENTS

Figure 1:
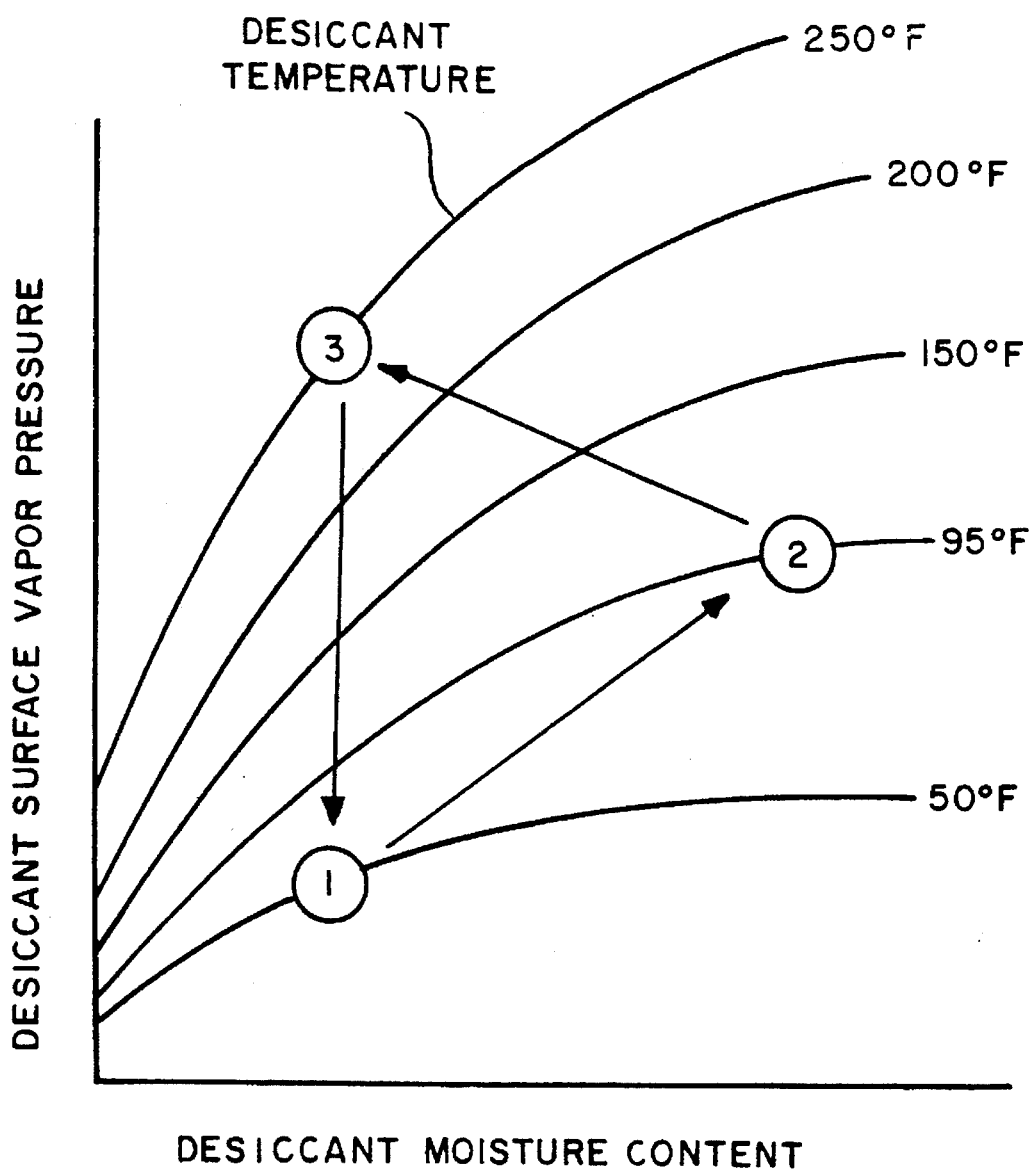
FIG. 1 is a graph illustrating a conventional desiccant dehumidification cycle.

The present invention is a vapor extraction system in which vapor is condensed into liquid as a gel sorbent expands, and then is subsequently disgorged as liquid from the gel sorbent as the gel sorbent collapses. The invention thus embodies a vapor-liquid-liquid extraction system.

A "gel" is a form of material between the liquid and solid state, consisting of a cross-linked network of long polymer molecules with liquid molecules trapped within the network. A "sorbent" refers to a material that has the ability to attract and hold liquids. Sorbents may attract other materials besides water vapor such as organic vapors of volatile organic compounds. A "desiccant" is a subset of a sorbent, with a particular affinity for water. The term "gas" and "vapor" are used interchangeably herein.

The present apparatus and method accomplishes this by utilizing movement of a gel sorbent relative to an environmental condition. This is illustrated schematically in the vapor extractor of FIG. 2. A gel sorbent 16 is exposed to a vapor at an arbitrary position 1 (represented by the dotted outlines). At this position, and under a first environmental condition, the sorbent is allowed to become swollen with liquid condensed from the vapor phase. This engorgement of sorbent with liquid allows the sorbent to physically swell. The sorbent is then moved relative to the first environmental condition to a second position 2 where the sorbent encounters a second environmental condition. This second environmental condition induces the gel sorbent to undergo a phase transition in which the gel structure collapses or shrinks (represented by the dashed outlines) and disgorges the previously condensed liquid out of the gel.

As discussed more fully in Section A, below, a "gel sorbent" is a polymeric material in which the gel sorbent has one or both of the following properties: (i) an ability to sorb vapor as liquid; and/or (ii) an ability to collapse in a phase-transition. At position 1, the gel sorbent is in a "sorptive" mode as the entire gel, or a sorptive component thereof condenses vapor as the liquid is adsorbed and/or absorbed by the gel sorbent. The term "adsorbed" refers to accumulation of liquid substantially on one or more outer surfaces of the gel sorbent, usually under conditions of low relative humidity. Generally, sorbents that adsorb liquid will not swell. The term "absorbed" refers to accumulation of liquid substantially within the interstices of the gel sorbent, leading to expansion of the gel sorbent. Preferred gel sorbents absorb sufficient liquid so that the entire gel sorbent, on the sorptive component thereof, will deliquesce. The term "deliquesce" or "deliquiescent" refers to a gel sorbent that takes up liquid to become substantially a solution of gel. Thus, at position 1, the vapor undergoes sorption and the entire gel or its sorptive component expands. The term "vapor" includes water vapor and non-aqueous (i.e. organic) vapors from a variety of organics including common and commercially important organic solvents such as acetone, toluene and ethanol (See Example 6).

The gel sorbent, in its swollen, deliquescent condition, is then challenged at position 2 with an environmental change. The environmental change affects the gel sorbent by causing the entire gel sorbent, or a component thereof, to undergo a collapse by way of a phase-transition. The phase-transition involves a shift between two equilibrium states (i.e., swollen and collapsed). This should be contrasted with sorption in position 1, the sorption merely representing a change from a non-equilibrium condition (i.e. a dry gel sorbent) to an equilibrium condition (i.e. a liquid filled or deliquesced gel sorbent). No phase-transition occurs during this sorption step at position 1.

The phase-transition collapse of the entire gel, or a component thereof, at position 2 may be either continuous or discontinuous. A "continuous" phase-transition is marked by a change in volume (i.e. a collapse) that occurs over a relatively large change in environmental condition. Moreover, there exists at least one stable volume near the transition between the swollen and collapsed states.

Preferably, gel sorbents of the invention undergo a "discontinuous" phase-transition in which the transition from swollen to collapsed states occurs over a very small change in environmental condition. There is no stable volume between the swollen and collapsed states at the transition and the transition appears to occur very rapidly. A gel sorbent undergoing a continuous phase-transition may have a similar order of magnitude total volume change as a gel sorbent undergoing a discontinuous phase-transition, yet the latter transition occurs over a small change in environmental condition (e.g. 0.1 degree C.). Moreover, discontinuous phase transitions are characterized by the presence of hysteresis in the volume/environmental change relationship. That is, one may ascertain if a gel sorbent undergoes a discontinuous phase transition if the volume trajectory in going from an expanded to collapsed state is different then the trajectory in going from a collapsed to an expanded state.

Referring again to FIG. 2, a gas stream 11 containing a vapor is introduced by way of a pump, fan or other device 12 into a substrate 14 containing a gel sorbent 16.

Figure 2:
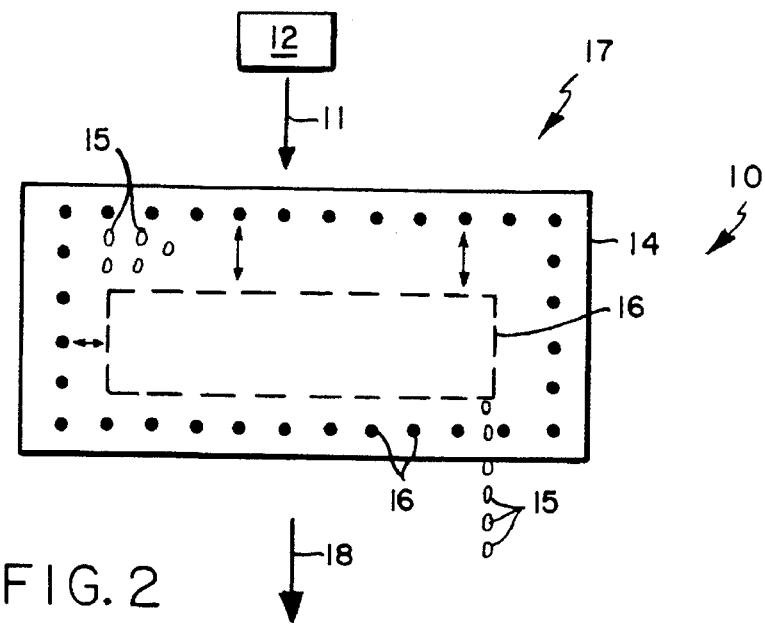
FIG. 2 is a diagram of a gel sorbent-based vapor extraction apparatus of the invention.

The gel sorbent 16 undergoes a phase-transition collapse when challenged with a change in an environmental condition 17. In particular, a gel sorbent of the invention may swell and absorb vapor as liquid 15 when subjected to one environmental condition, and subsequently collapse and disgorge the entrained liquid at another environmental condition. The dry gas stream 18 is then removed from the extractor. This expansion and contraction is schematically illustrated in FIG. 2 as the double-headed arrow connecting the dashed and dotted outlines.

Figure 3:
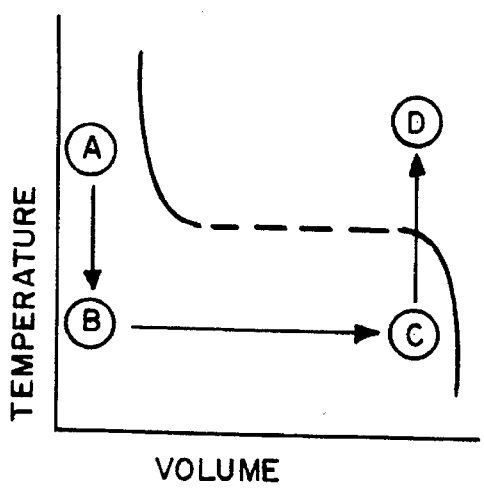
FIG. 3 is a graph illustrating one embodiment of a gel sorbent-based vapor extraction cycle.

In one embodiment, the gel sorbent expands to absorb water vapor and undergoes a phase-transition to disgorge the entrained liquid at a temperature higher than the temperature of the gel in its sorptive mode (See FIG. 3 and Examples 1 and 2). In another embodiment, the gel sorbent undergoes a phase-transition at a lower temperature than in its sorptive mode (see FIG. 4 and Example 4). In a further embodiment, the gel sorbent collapses during exposure to a level of radiation that is different than the radiation level exposed in the sorptive mode (see Example 5). In yet another embodiment, the gel sorbent collapses at a level of electric field different than the level of electric field in the sorptive mode (see Example 1).

FIG. 3 is a schematic illustration of one type of preferred vapor extraction cycle of the invention, plotting gel sorbent volume on the x-axis as a function of environmental condition (i.e. temperature) on the y-axis. As the gel is brought into contact with a vapor, the gel undergoes an expansion in volume. This expansion of the gel occurs below a transition temperature. A gas (i.e., a single gas or a mixture of gases) containing at least one vapor phase capable of extraction is represented by arbitrary Point A and is brought into contact with the gel sorbent. The gel sorbent is then cooled to Point B to a temperature below the transition temperature. Alternately, the gas phase may initially be at the temperature of Point B, avoiding the need for a cooling step.

At Point B, the gel sorbent is caused to expand by sorption of the vapor as liquid and trapping of liquid on the gel surface and/or within the large void fraction of the gel sorbent. The gel sorbent now undergoes movement relative to the environmental condition and moves to Point C. The sorbent is regenerated by exposing it to a temperature (Point D) which is greater than the transition temperature. The gel sorbent undergoes a rapid and reversible, discontinuous phase transition by collapsing and disgorging the liquid contained within the gel sorbent out into the environment. The cycle may then be repeated.

It will be apparent that the release of liquid from the gel at point D requires much less heat than does conventional desiccant dehumidification systems. Conventional desiccant dehumidifiers require enough heat input so that all of the liquid contained within the desiccant is driven off as vapor. On the contrary, the amount of energy required for mechanical contraction of the present gel sorbents is much less. In desiccant systems, adequate energy must be supplied to raise the desiccant to the regeneration temperature. In the present system, only the energy required to collapse the gel sorbent is needed. Furthermore, the temperature at which gel sorbent collapse (i.e., regeneration) occurs is much lower than the regeneration temperature of desiccants, which means that carry-over heat to the conditioned air stream is virtually eliminated. This reduces the amount of energy needed to cool the air (See Example 8).

Figure 4:
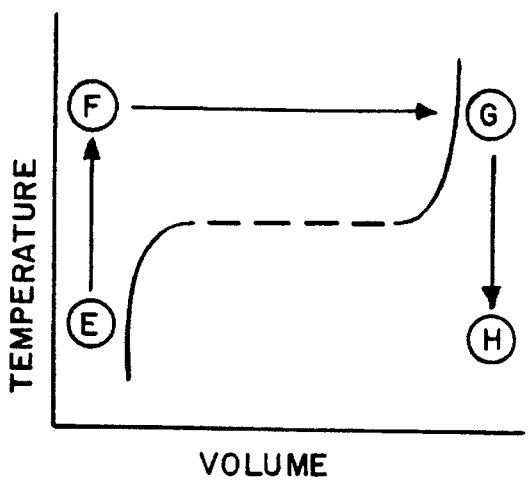
FIG. 4 is a graph illustrating another embodiment of a gel-sorbent-based vapor extraction cycle.

FIG. 4 is a schematic illustration of another preferred vapor extraction cycle using a gel sorbent whose phase behavior is the opposite of that discussed above in FIG. 3.

The respective x- and y-axes are labeled the same as in FIG. 3. At an environmental condition (i.e. temperature) above the transition temperature, the gel sorbent condenses liquid and expands in volume. A gas phase containing vapor is represented by temperature Point E and is brought into contact with the gel sorbent. The gel sorbent is then warmed to Point F at a temperature above the critical temperature. Alternately, the gas phase may initially be at the temperature of Point F, avoiding the need for a warming step. At this point, the sorbent expands to absorb the vapor as liquid. The gel sorbent is now at Point G and is regenerated by cooling the sorbent to a temperature (Point I-I) which is less than the transition temperature. The gel sorbent rapidly and reversibly collapses and disgorges the liquid contained within the gel sorbent out into the environment. The cycle may be repeated.

It will be understood that a gel-based vapor extraction cycle using a sorbent of the type illustrated in FIG. 4 will have a regeneration step in which the heat carry-over is negligible. This is because the sorbent is cooler during collapse (i.e., regeneration) than during sorption. A gel-based vapor extraction process using the "reverse gel" cycle of FIG. 4 offers considerable savings in terms of cost per unit vapor removed (See Example 8).

Although the two vapor extraction cycles illustrated here are based on changes in temperature, it will be appreciated that a variety of other environmental factors, discussed below, may be employed.

A. GEL-BASED SORBENTS

Requirements and Design

Recently, phase transition phenomena have been observed in permanently crosslinked polymer networks that exist as gels. The term "polymer network" refers to polymers crosslinked to create a tangled network and immersed in liquid medium. As an external environmental condition (e.g., temperature; solvent composition) is changed, the polymer network becomes increasingly compressible, and at a certain point, it becomes infinitely compressible. At the same time, the effective pore size of the network increases. It was also observed that the volume of such a gel changes reversibly by a factor as large as several hundred when the gel is presented with a small change in external conditions such as solvent chemical composition or temperature. Tanaka, Physical Review Letters, Vol. 40, no. 12, pp. 820–823, 1978 and Tanaka et al, Physical Review Letters, Vol. 38, No. 14, pp 771–774, 1977; Tanaka et al Physical Review Letters 5, Vol 45, pg. 1636, 1980; Ilovsky, Macromolecules, Vol. 15, pg. 782, 1982; Hrouz et al, Europ. Polym. J., Vol. 17, pg. 361, 1981; Ohmine et al, J. Chem. Physics, Vol. 8, pg. 6379, 1984; Tanaka et al, Science, Vol. 218, pg. 462, 1972 and Ilavsky et al, Polm. Bull. Vol. 7, pg. 107, 1982, all of which are incorporated herein by reference.

The vapor extraction apparatus of this invention requires a gel sorbent with several characteristics. In the sorptive mode (i.e. position 1) the gel sorbent must act as a desiccant with a high sorption capacity. Most preferably, the gel sorbent or its sorptive component, will deliquesce under high liquid loading. In the regeneration mode (position 2) the primary requirement is that the gel sorbent, or its regenerative component, undergo a phase-transition collapse to disgorge entrained liquid. As a whole, the gel sorbent must meet the requirements described above. Nevertheless, the gel sorbent of the invention may include several components as long as at least one component(s) provides the sorptive property and the other component(s) provides the regenerative (phase-transition) property.

For instance, the gel sorbent may be a single material such as a single polymer network which meets both sorptive and regenerative requirements. Exemplary materials include poly-N isopropylacrylamide (NIPA) gels at 100% relative humidity (See Example 2).

The gel sorbent may also include two or more components, each component having the required property. For example, a co-polymer gel may be fabricated in which one component has both a high sorptive capacity and deliquesces; the other component having a collapsing phase-transition property responsive to an environmental condition. Exemplary sorbents of this type include poly-N isopropylacrylamide [NIPA: "regenerative component"] poly(methacarylamidopropyltrimethylammonium chloride [MAPTAC: "sorptive" component]. A primarily sorptive/deliquescent gel may also be made in the presence of a phase-transition or regeneration gel.

The gel sorbent may also be an interpenetrating polymer network (IPN) in which a first polymer interpenetrates a second polymer. An IPN may possess only a regenerative (phase-transition) property such as poly-N isopropylacrylamide. A purely "regenerative" IPN may thus be combined (e.g. co-polymerized) with a sorptive gel to meet the requirements of the present vapor extraction system. A purely "regenerative" IPN may itself be combined in an IPN with a "sorptive" component such as poly(MAPTAC).

The IPN may possess both properties, however, so that one member of the IPN provides the sorptive/deliquescent property and the other member provides the phase-transition property. Alternately, a phase transition IPN may itself form an IPN with a sorptive/deliquescent gel.

Polymers of an interpenetrating gel sorbent can include natural polymers, synthetic polymers, or cross-linked natural and synthetic polymers. Examples of synthetic polymers include poly(acrylamide), poly(acrylic acid), and the like.

As discussed previously, an important advantage of combining different polymers as part of the gel sorbent (see for example the interpenetrating polymer networks described above) is that one member(s) of the gel sorbent may be chosen for its strong ability to undergo collapsing phase transition and the other member(s) may be chosen for maximum vapor absorption ability. In this regard, polymers of MAPTAC are extremely useful. By itself, poly(MAPTAC) is not a phase transition gel bit will absorb large amounts of water vapor. Significantly, poly(MAPTAC) will absorb at least 50% of its weight as water vapor at relative humidity of about 70% (see Example 3) and, once the water vapor is absorbed as liquid, the poly(MAPTAC) will deliquesce (i.e., become liquid) and be converted into a poly-(MAPTAC) solution. An enhanced capacity for water absorption is facilitated by poly(MAPTAC) and desorption of the liquid water taken up by the poly(MAPTAC) is facilitated by the phase-transition gel moiety. The poly-(MAPTAC) will not be disgorged along with the liquid water because it is too large a molecule. Examples of gel sorbent combinations utilizing poly(MAPTAC) include, but are not limited to any of the gel sorbents described previously such as poly-N isopropylacrylamide poly(methacrylamidopropyltrimethylammonium chloride[MAPTAC])/water; poly(methacrylamidopropyltrimethylammonium) chloride[MAPTAC])/water; and acrylamide-sodium acrylate/methacryl amidopropyltrimethylammoniumchloride/water. Polymers of MAPTAC may be combined with a phase transition gel, either in an interpenetrating network, by copolymerization, or by synthesizing a phase-transition gel sorbent in the presence of poly(MAPTAC). Other polymers like poly(MAPTAC) that are not phase transition gels but are useful for their liquid absorption properties include polyvinylimidazole.

Representative crosslinking agents useful for making the gel sorbents of the invention include N,N'-methylene-bis acrylamide, ethylene glycol dimethacrylate, glycerine triacrylate or divinylbenzene-1- or the like. The concentration of crosslinkable material is generally about 0.3 to 4 mole percent based upon the polymerizable material which is the main component. The crosslinking agent effects partial crosslinking of the polymer and provides a means to control the gel's mechanical strength, swelling degree, and intensity of phase transition trigger by changing the crosslinking density.

Polymerization is initiated using a polymerization initiator, e.g., a free radical initiator such as ammonium persulfate or sodium metal bisulfite, etc., with dilution with a solvent, e.g., water, a lower alcohol, hydrocarbon, etc., or without dilution. However, neither the solvent nor the polymerization initiator are always important factors to obtain the polymerized product from the monomer mixture, and any method suitably selected from conventionally well-known gelation methods may be applied. Crosslinking can also be introduced to polymers by ultraviolet or electron beam irradiation.

On a molecular level, the gel sorbents for use in the present vapor-extraction apparatus are sensitive to small changes in a restricted repertoire of "trigger" conditions consisting of temperature, pH, solvent concentration, and ion concentration. Nevertheless, on a macroscopic level, any of a variety of environmental conditions may be imposed on the gel which allows the specific trigger to induce a phase-transition. These environmental conditions may, but not necessarily, be the same as the trigger and include, but are not limited to, a change in temperature, electric field, photon energy, pH, solvent composition, ion concentration, concentration of biomolecules, and the like. Preferably, a gel sorbent may be combined with a material that acts as a molecular "transducer", converting an environmental condition into an appropriate trigger. For example, a dye may be introduced into a temperature-triggered gel sorbent. The dye is designed to absorb light of a given energy and convert the light energy into heat, thus triggering the gel sorbent to undergo a phase-transition. See, for example, A. Suzuki and T. Tanaka, Nature: 346:6282 (1990), incorporated herein by reference. Similarly, a pH-sensitive gel sorbent may be combined with a dye that, upon interaction with light, will change the pH of the gel sorbent and trigger a phase-transition. See for example, U.S. patent application Ser. No. 07/936,681, filed Aug. 27, 1992 now abandoned, entitled "Light Powered Synthetic Muscles", by Albert R. Zorino (assigned to the United States Navy).

The collapsing or regenerative phase-transitions of gels described herein result from competition between intermolecular forces, usually electrostatic in nature, that act to expand the polymer network; and at least one attractive force that acts to shrink it.

Volume transitions in gel sorbents are driven by four fundamental forces: ionic, hydrophobic, hydrogen bonding and van der Waals bonding interactions, either alone or in combination. Each of these interactions may be independently responsible for a discontinuous volume transition in gels of the invention. Each of these fundamental forces is most strongly affected by a particular trigger. Changes in solvent concentration most strongly affect the van der Waals interaction; changes in temperature most strongly affect hydrophobic interactions and hydrogen bonding; and changes in pH and ion concentration most strongly affect ionic interactions.

A general principle for selecting a phase-transition gel is to select a particular gel whose phase-transition is driven by a particular fundamental interaction. Thus, a gel whose phase transition is governed by ionic interactions would include components that are weakly acidic and weakly basic, such as poly(acrylic acid)/poly(methacrylamidopropyltrimethylammonium chloride[MAPTAC])/water; poly(acrylic acid)/poly(allylamide)/water; poly(styrenesulfonate)/poly(allylamide)/water, and the like. Gels of this type are sensitive to pH.

Gels whose phase transition is governed by hydrogen bonding will collapse with a decrease in temperature (see FIG. 4) and are exemplified by interpenetrating gel sorbents that comprise poly(acrylic acid) as one polymer, poly(acrylamide) as the other polymer, and water as the liquid medium. Gels whose phase-transition is governed by hydrophobic interactions will collapse when challenged with an increase in temperature (see FIG. 3) and are exemplified by poly(N-isopropylacrylamide:NIPA). Gels whose phase-transition are governed by van der Waals interactions will behave similarly to those governed by hydrophobic interactions and are exemplified by polyacrylamide gels.

Gels may be formulated in which the phase-transition is governed by more than one fundamental force. In particular, gels consisting of copolymers of positively and negatively charged groups meet this requirement. In these gels, polymer segments interact with each other through ionic interactions and hydrogen bonding. The combination of these forces results in the existence of several pH-driven phases. See Annaka and Tanaka, Nature 355:430–432 (1992), incorporated herein by reference. An exemplary gel of this type is a copolymer of acrylic acid and methacryl-amidopropyl-trimethyl ammonium chloride (MAPTAC).

Phase transition of gels can be derived from its equations of state that relate three characteristic state variables of the get: volume (V) or equivalent density of the polymer network ($\phi$), temperature (T) plus polymer-solvent interaction parameter ($\Delta F$), and the osmotic pressure ($\pi$). At equilibrium, the osmotic pressure of a gel must be zero ($\pi=0$).

Using equation 1, one may determine the temperature (Tc) of the phase transition where ($\theta$) is the theta temperature of the polymer network in the solvent, and $\phi_o$ is the concentration of the polymer network when in a random walk configuration.

$$T_c \theta/(1 \pm 22.5\phi_o) \quad \text{(Equation 1)}$$

The sign in the denominator is plus for gels which collapse at lower temperature (see FIG. 4 and Example 4) and minus for gels which collapse at higher temperatures (see FIG. 3 and Examples 1 and 2).

Three osmotic pressures contribute to the total osmotic pressure of a gel, as shown below in equations 2, 3, 4 and 5.

$$\pi = \pi_{rubber} + \pi_{affinity} + \pi_{ion} \quad \text{(Equation 2)}$$

$$\pi_{rubber} = v_o kT\{(\phi/2\phi_o) - (\phi/\phi_o)^{1/3}\} \quad \text{(Equation 3)}$$

$$\pi_{affinity} = v_o kT\{ln(1-\phi) + \phi\} + \Delta F(\phi/\phi_o)^2 \quad \text{(Equation 4)}$$

$$\pi_{ion} = v_o kT\{(\phi/\phi_o)\} \quad \text{(Equation 5)}$$

Here, $V_o$ denotes the number of effective crosslinks of the network when it is in the random walk configuration whose density is denoted by $\phi_o$. This state is referred to as the reference state. The rubber elasticity, $\pi_{rubber}$, which originates from the configurational entropy of the polymer network, provides a restoring pressure back to the reference polymer network density. When a polymer network is expanded, a negative pressure is created in the network and its shrinks back. On the other hand, when it is contracted, the pressure acts to expand to the original reference state. Secondly, the polymer-polymer and polymer-solvent interactions give rise to another osmotic pressure, $\pi_{affinity}$. In a poor solvent, the polymer network tends to shrink, whereas in a good solvent a gel tends to swell. The last factor is the osmotic pressure due to ionization of the polymer network, $\pi_{ion}$. The counter-ions within the gel create a gas-type pressure to expand the gel in proportion to the density of counter-ions as well as the absolute temperature, kT, where k is the Boltzmann constant.

These three osmotic pressures compete with each other and the gel volume is equilibrated in a condition at which these three osmotic pressures balance at $\pi=0$. There is a special condition at which the competing pressures become equal to each other, at which point the transition occurs. When the ionization pressure is large, as in the case of extensively ionized gels, the volume transition is drastic and discontinuous. With increased ionization, the volume change at the transition becomes large. There exists a minimum critical concentration of ionic component within a gel sorbent for each solvent system employed in order to achieve reversible drastic volume change of the gel sorbent. This minimum ionic concentration can be determined for each polymer network and solvent system.

The equations above quantitatively explain all of these aspects of the phase transition. See T. Tanaka, D. J. Filmore, S-T. Sun, I. Nihio, G A. Swilslow, and A. Shar, *Phys. Rev, Letters*, 45 1636 (1980) and U.S. Pat. No. 5,100,933 (Tanaka et al.), incorporated herein by reference.

To calculate the temperature dependent swelling ratio, the temperature dependence of X is taken explicitly in to account as shown in Equation 6 where $\Delta F$ represents the difference in the free energy of a solvent molecule that is immersed in pure polymer compared with one that is surrounded entirely by molecules of the same kind, $\Delta H$ and S are the corresponding enthalpy and entropy changes, respectively.

$$x=\Delta F/2kT=(\Delta H-T\Delta S)/2kT \qquad \text{(Equation 6)}$$

Using Eqs. (2), (3) and (4), an equation relating the equilibrium concentration of a gel to temperature is shown in Equation 7.

$$1/T=\Delta S/\Delta H-2k/\Delta H\{(v_o v_e/\phi^2]\phi/\phi_o)^{1/3}-(f+\frac{1}{2})((\phi/\phi_o)]+\ln(1-\phi)+\phi+\phi^2/2\}$$

where $v_o$ is the molar volume of water.

Among the parameters in Eq. (6), $\phi$, can be estimated fairly accurately from the experimental asymptotic value of $V/V_o$ toward high temperature, i.e., $\phi_o\approx 0.065\text{--}0.075$. Also, the maximum number of v can be estimated from an mount of crosslinker used. It is clear from Eq. (6) that the transition temperature is mainly determined by the ratio $\Delta S/\Delta H$, while the curvature of a swelling curve is mainly determined by $\Delta H$.

The gel sorbent of this invention is prepared by swelling one of the above-mentioned polymerized products in a liquid medium. A polymerized product having a low degree of crosslinking absorbs a large amount of the liquid medium to form a gel having a large degree of swelling. The gel sorbents of this invention thus prepared, however, never swell without limit but reach an equilibrium state in which the gel coexists with the excess liquid medium after swelling to its limit.

B. GEL-BASED SORBENT CONFIGURATIONS

Them are several different configurations of vapor extraction apparatus that are included within the scope of the present invention.

1. Liquid Sprayer

Figure 5:
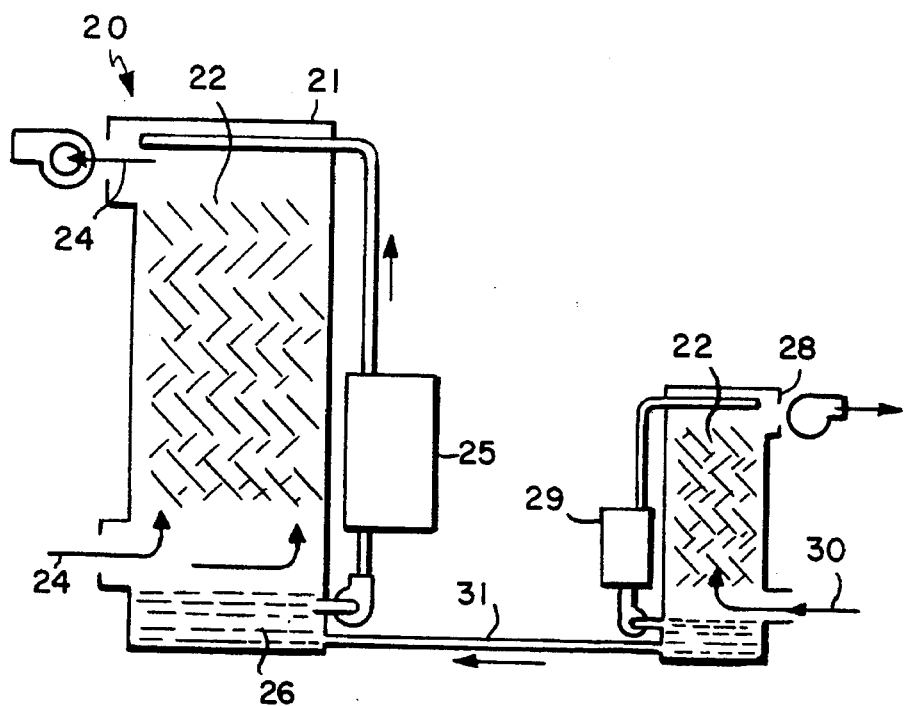
FIG. 5 is a schematic illustration of one embodiment of an apparatus of the invention.

FIG. 5 illustrates vapor extraction using a spray element 20 disposed within housing 21. In this embodiment, the sorbent is moved relative to an environmental condition. Extraction relies on spraying gel sorbent 22 directly into a gas stream 24. The gel sorbent 22 is sprayed into the gas under environmental conditions such that the gel absorbs the vapor from the gas, expands in volume and falls to a sump 26. The gel may be sprayed back into the gas stream and will continue to absorb vapor. After extraction of vapor, part of the expanded gel is drained off and circulated through a sorbent regeneration housing 28 (circulation pathway not shown here). In the regeneration housing 28, the gel sorbent 22 may be sprayed into a second, "regeneration" gas stream 30 under conditions such that the liquid is disgorged from the sorbent. For example, the regeneration gas stream 30 or the gel sorbent can be warmed above its transition temperature so that it will undergo phase-transition collapse. (See FIG. 3).

In the embodiment illustrated, the spray element 20 on the left of FIG. 5 cools the gel sorbent 22. The sorbent absorbs vapor as liquid, and expands in volume. The gel is then sprayed into a second, regeneration gas stream 30 and undergoes a phase-transition (i.e. collapse) by subjecting the gel sorbent to a temperature greater than the transition temperature using heater 29. The liquid is forced out of the gel into second gas stream 30. Alternately, microwave energy may be applied to the sorbent in the regeneration element. Microwave heating of the gel is advantageous because it provides a means for uniform heating of the gel sorbent so that all of the sorbent undergoes phase transition substantially at the same time. As the gel sorbent returns via conduit 31 from regeneration housing 28 back to housing 21, it is cooled by chilling system 25 and made ready to absorb more vapor, repeating the extraction cycle.

In another embodiment, the sorbent is sprayed and simultaneously irradiated with electromagnetic radiation of ultraviolet wavelength to allow the gel sorbent to expand and absorb water vapor (i.e., sorption). The expanded gel sorbent is then sprayed into a second gas stream that is not irradiated with ultraviolet radiation; the gel sorbent will undergo phase-transition collapse and disgorge the liquid (i.e. regeneration). In an analogous manner, the sprayed gel sorbent may be subjected to an electric field, whereupon the gel will collapse and release entrained liquid.

2. Solid Housing

Figure 6:
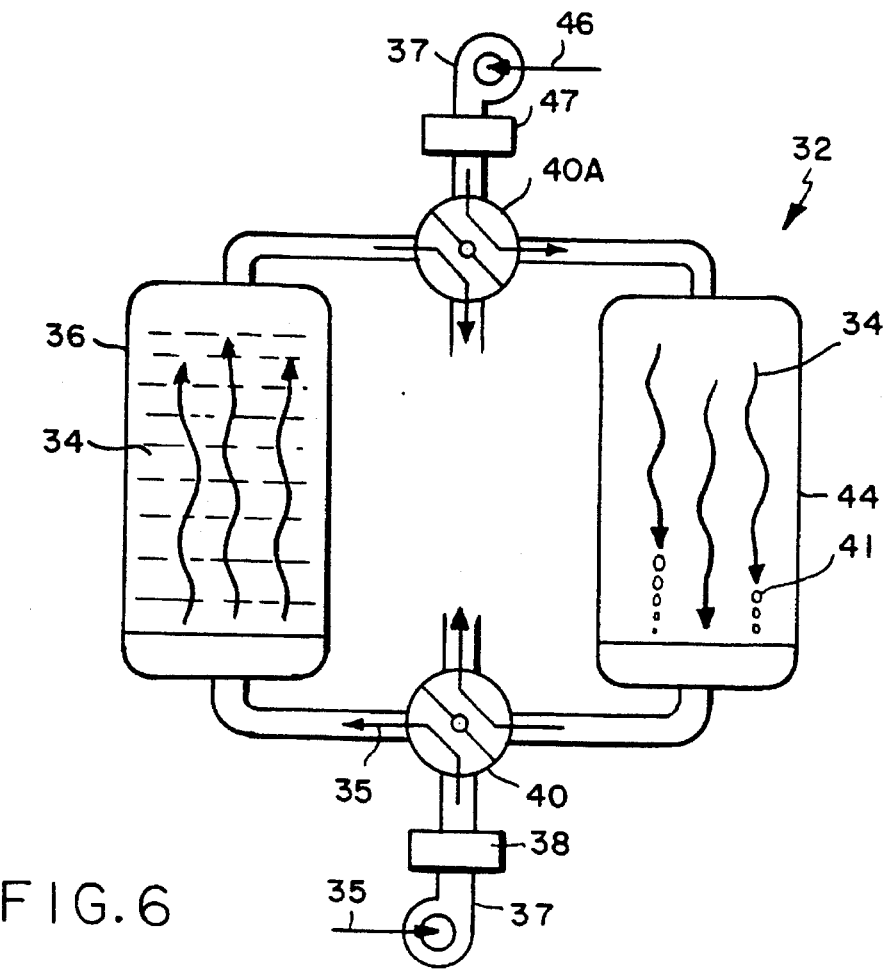
FIG. 6 is a schematic illustration of a second embodiment of an apparatus of the invention.

In a solid housing vapor extractor 32 (FIG. 6), a gel sorbent 34 is packed into housing 36. Gas 35 enters housing 36 by way of pump 37 and two-way valve 40. Using the cycle of FIG. 3 as an example, the housing 36 may, for example, be cooled by lowering the temperature of the inflowing gas with refrigerant means 38. The gel sorbent 34 encounters this condition and sorbs liquid from the surrounding gas. Simultaneously, a gas stream 46, warmed by means 47, forces the gel sorbent 34 of housing 44 to undergo phase-transition collapse (i.e. regeneration) and release liquid 41 through two-way valve 40A.

After the gel sorbent in housing 36 becomes fully expanded and saturated with moisture, gas 35 is diverted through two-way valve 40 into second, sorbent-filled housing 44 and the gel sorbent in first housing 36 is regenerated by subjecting the gel sorbent in the first housing to heated gas stream 46 via two-way valve 40A. The liquid contained within the gel sorbent of housing 36 is purged from the housing with the heated gas stream 46 while housing 44 is absorbing vapor. Two-way valves 40, 40A are then engaged to repeat the cycle once housing 36 is purged. As described above, the gel sorbent contained within the housing(s) may be conveniently be heated with microwave energy or heated gas.

Alternately, the gel sorbent may be irradiated with light of ultraviolet wavelength in order to allow the gel to sorb liquid and expand. The expanded gel sorbent may then be distributed into a gel-packed housing that is not irradiated with ultraviolet radiation; the gel sorbent will phase-transition collapse and disgorge the liquid. In an analogous manner, the gel sorbent contained within the housing(s) may be subject to an electric field (see Example 1), whereupon the gel will contract and release entrained liquid.

3. Rotating Sorbent Housing

In this configuration (FIG. 7), a housing 50 containing a gel sorbent 52 is slowly rotated into, and out of a gas stream 54 using any of a variety of commonly-available motors, ratchet drives and the like. With regard to the sorbent cycle of FIG. 3, the housing 50 is rotated through the gas and exposed at a first position, illustrated as discrete area 56, to a temperature lower than the transition temperature so that the gel sorbent 52 will absorb vapor into the liquid state and expand. Then the housing 50 continues its rotation to a second position 58 and is exposed to an environmental condition (i.e., a higher temperature produced by heater 59) which regenerates the gel sorbent 52 and collapses the gel sorbent to disgorge liquid.

In use, the gel sorbent starts out dry and warm having just left the regeneration side (i.e., second position). The gel sorbent may be cooled by the inflowing gas or by other means during the fast few degrees of rotation through the process side (i.e., first position). Then the gel sorbent absorbs the rest of the gas moisture and picks up liquid. As the housing 50 rotates to the warmer, second position 58, the gel sorbent collapses and releases the liquid. This design is modular, and to increase capacity, one may either increase the diameter of the rotating housings so that they will hold more gel or increase the number of housings stacked adjacent one another. Horizontally arranged housings are also within the scope of the invention. Other embodiments include several gel sorbent housings vertically arranged in a circle as a carousel that rotates by means of a ratchet drive system.

Another design includes a rotating housing in which the gel sorbent is impregnated directly into a supporting matrix in the housing's structure. Those of ordinary skill in the art will understand that a wide variety of rotating disk or wheel housings have been developed to support conventional desiccant materials and may be adapted for use with the present gel sorbents. For example, a rotatable housing may include a very thin disk (i.e., several hundredths of an inch) having a matrix of perforations defined in the disk. The gel sorbent material is contained within the perforations. The total heat capacity of a thin disk is small, relative to large housings with a substantial thickness. See U.S. Pat. No. 3,140,936, incorporated herein by reference.

Another exemplary rotating housing includes a series of supporting matrix elements that are alternating layers of sheets. One sheet may be flat and the next corrugated; both sheets may be corrugated as well. These corrugated layers form a multiplicity of cells similar to a honeycomb permeable to gas in a given direction. Preferably, the plurality of internal, substantially laminated corrugations is wound as a unit in a circle or spiral to form the housing. See, for example, U.S. Pat. No. 4,753,918, incorporated herein by reference.

The housing rotates slowly to a first position and the gas flows through the corrugations in a direction substantially parallel to the sorbent-lined cells formed by successive layers of corrugations. The sorbent within the wheel absorbs the vapor in the gas stream. As the housing rotates into a second position, the gel sorbent is induced to disgorge its entrained liquid into a surrounding gas stream. Following this, the gel sorbent rotates back into the first position so that it can collect more moisture from the inflowing gas.

The honeycomb structure may be made of very lightweight porous material such as fiberglass. Different kinds of gel sorbents may be loaded into the structure which allows the housing to be tailored into specific applications. Since the corrugations of the structure act like individual sorbent-lined air cells, the gel surface area presented to the process air is at a maximum. Exemplary constructions of rotating housings can vary, depending upon the requirements. Rotatable housing can range from one foot or less in diameter to many tens of feet in diameter.

The gel sorbents of the present invention may be made in a variety of forms, particularly suited to the specific application. Thin films, between 10 microns and several millimeters thick, may be made by providing a spacer of the appropriate thickness to the outer periphery of a glass plate. The spacer may conveniently be made of polyethylene film. A pre-gel solution (see Example 1) is applied to the glass plate within the confines of the mold created by the spacer. Gelation is initiated and another glass plate is superimposed on the first glass plate. After gelation is completed, the thin gel sorbent film may be peeled out of the mold.

Gel beads may be made by polymerization methods known in the art for preparing uniform polymer beads. See, for example, Okubo and Nakagawa, "Preparation of Micron-Sized Monodisperse Polymer Particles having highly Cross-Linked Structures and Vinyl Groups by Seeded Polymerization of Divinylbenzene Using the Dynamic Swelling Method", Colloid and Polymer Science, 270:853–858 (1992), incorporated herein by reference and Park and Hoffman, "Preparation of Large, Uniform Temperature-Sensitive Hydrogel Beads", J. Polymer Science: Part A: 80:505–507 (1992), incorporated herein by reference. The size of the beads may vary from 0.1 micron in diameter to 1000 microns in diameter. Preferred beads will vary within a range dictated by the particular application. Beads that are too small will not be retained within the apparatus and beads that are too large may have phase-transition kinetics that are too slow. Preferred beads are about 10 microns in diameter.

Gel fibers may be fabricated by a variety of extrusion methods, including that of developing the gel sorbent in the narrow bore of micropipette (See Example 4). Fibers may range in dimensions from 20 microns in diameter to 1 millimeter in diameter. Preferred fibers are about 10 microns in diameter.

The gel sorbents of the present invention may be immobilized to a support by a variety of well-characterized processes for polymer adherence such as radiation grafting, photochemical grafting, plasma gas discharge polymer deposition, chemically-initiated grafting (e.g., ozone initiation) and so on. The supporting matrix of the housing may be fabricated as a polymer and may be activated to form free radicals on its backbone in the presence of the gel sorbents of the invention, or may be preactivated either in an inert atmosphere or in an air atmosphere to provide active sites which are capable of initiating polymerization of a gel sorbent onto the surface of the polymeric supporting matrix. The gel sorbent may also be physically absorbed or otherwise trapped in the interstices of a supporting matrix such as fiberglass or cellulose. (See Example 7). Development of a gel directly within a porous matrix may be applied to any gel sorbent of the invention.

There are several ways to enhance the sorptive capacity of a gel to enhance liquid uptake in the "sorptive" mode particularly in conditions of low relative humidity. Generally, sorptive capacity is increased by modifying the relative balance between the gas stream vapor pressure and the liquid pressure of the gel sorbent. The vapor pressure of the gas stream may be increased, thus increasing the relative humidity. This may be accomplished by raising the total pressure of the gas stream or by lowering its temperature so that more vapor may be carried.

The swelling power of a gel sorbent may also be increased by applying a static electric field. A gel that is a weak sorber or a non-sorber at low relative humidity, can be made a good sorber by application of an electric surface charge to increase the gel's osmotic pressure. Briefly, an electric surface charge on a gel will produce a reduced vapor pressure above it which acts alone or in concert with the osmotic pressure of a gel to enhance liquid vapor sorption. Charged water droplets have a reduced vapor pressure over their surfaces compared to uncharged droplets (R. H. Byers, General Meteorology, p. 434, McGraw-Hill Publ. 1959). For charged water droplets, the sorptive enhancement caused by the reduced vapor pressure is limited since the surface tension of the water droplet cannot hold its surface charge. At high surface charge densities, repelling forces will cause the droplet to fracture.

A gel, however, is not constrained by these same limitations imposed by surface tension or stress. A much larger surface charge density can be applied. Use of an electric field to enhance sorption is conveniently demonstrated by forming a gel sorbent as one or more plates of a capacitor (e.g. parallel plate, cylindrical, and the like). The gel sorbent is allowed to sorb vapor and during the sorption mode, an electrical field is applied to each plate of the gel capacitor, providing the gel with a surface charge. At a relative humidity of about 40% RH, an exemplary electric field is generated by applying about 2000 volts DC or 2000 volts AC to plates spaced apart about 0.5 min. The applied charge enhances sorption as described above. When sorption is completed, the sorbent is regenerated by either collapsing the sorbent by inducing a phase-transition and/or removing the surface charge. Removing the surface charge will remove liquid, not by inducing a phase transition (compare to Example 1) but by returning the gel to a condition where the balance between the vapor pressure above the gel and osmotic pressure within the gel forces the liquid to be disgorged. After removal of liquid, the gel sorbent is again brought to a sorptive mode position.

There are also one or more ways to enhance the regenerative kinetics of the present gel sorbents. The commercial value of gel sorbent vapor extraction systems depends upon the speed of liquid disgorgement. The stronger the collapsing power of a gel (i.e., the faster the phase-transition) the faster the extraction cycle.

Discontinuous phase-transitions are thus preferable over continuous phase-transitions. Forming a gel sorbent with the largest surface area to volume ratio is also preferred (i.e., beads or thin films) since transfer of a change in environmental condition to the gel will be substantially instantaneous and time lags in phase-transition resulting from inhomogeneous heat transfer will be eliminated. Collapse of the gel is also enhanced by applying an environmental condition evenly to the gel so that delivery is substantially instantaneous throughout the gel. Electric wire heating, hot air flow and, especially, application of microwave energy, is advantageous. An electric current may also be applied directly to a gel sorbent fiber. The fiber will act as a resistor, thus leading to heating of the gel sorbent.

Heating the gel sorbents uniformly can involve placing a microwave energy source in sufficient proximity to the gel sorbent. An internal heating source within a housing itself, such as an electric heater integral to a rotating housing or other housing described above, may also be used. Heated air is less effective as a heat source since it will pick up vapor in passing along the housing and become cooler. On the other hand, a series of tubes built directly into the housing that are filled with circulating hot water will heat the gel without the disadvantages of heated air.

There are many ways of removing disgorged liquid from the surface of the gel sorbent. In rotating housings described previously, whether vertically or horizontally arranged, a squeegee or other mechanical wiping arm can be applied to a surface of the housing to physically remove disgorged water. Alternately, the housing may be spun at high speed so that centrifugal forces will drive the disgorged liquid toward the outer, peripheral surface of the housing. Ultrasonic energy may be directed at the gel sorbent surface sufficient to dislodge the liquid accumulating thereon. An air flow of sufficient strength may also be directed at the surface of the gel sorbent. Capillary action may also be used to remove disgorged liquid. For example, if the gel sorbent is in the shape of individual fibers, another fiber of sufficient wicking capacity may be placed next to the gel fiber so that the wicking fiber will pick up the disgorged liquid. Preferably, removal of disgorged liquid in horizontally arrayed, rotatable housings may be accomplished using gravity by suspending a matrix of, for example, wicking material or inert tubing (i.e., Tygon tubing) inside the center of the rotatable housing.

It will also be appreciated that the gel-based sorbents of the present invention may be used in sorbent-based air conditioning/coolers. In particular, rotating housings are known to be useful as components of a desiccant-based cooling system. One embodiment of an air-conditioning system employing a "reverse" gel sorbent of the present invention is presented, with reference to FIG. 8, adapted from U.S. Pat. No. 4,729,774, incorporated herein by reference.

A gel-sorbent housing 60 is mounted for rotation on axis a. A stationary portion divides the exposed face of the housing 60 into two semi-circular areas. Area 60a of the housing defines the entrance to the process side of the system. Side 60b defines the exit point of the regeneration side of the system. A heat exchanger 62 is coaxially spaced from the housing 60, a partition dividing corresponding process 62a and regeneration 62b sides of the heat exchanger 62. The heat exchanger 62 and housing 60 may rotate in opposite directions. On the other side of heat exchanger 62, air is forced through a humidifier 64 having a water-laden media process lying in the process and regeneration 64B sides of the system. Electric motor low velocity fans or blowers (not shown) are typically used to move air through the housing 60 to the humidifier 64 on the process side and in the opposite direction on the regeneration side as shown by the arrows. A regeneration cooler 68 is positioned between the heat exchanger 62b on the regeneration side and the regeneration side of housing 60.

In use, moist, hot air from outdoors is drawn into the exposed process side face 60a of the housing 60 at point 1. Passing through the housing, the air is dehumidified by vapor extraction accomplished by expansion of the gel sorbent described herein. Besides drying the air, extraction of the vapor also heats the air by releasing the latent heat as sensible heat. At point 2, the dry air, now hotter than the ambient air, encounters the heat exchanger 62a, a heat capacity structure made, for example, of aluminum, which transfers part of the heat in the air at point 2 to the regeneration side of the system. Leaving the heat exchanger 62a at a lower temperature, but still dry, the air encounters the water-laden media 64a at point 3. Taking on water vapor absorbs heat from the air stream, resulting in cooler, humidified air entering the conditioned spaces at point 4.

On the regeneration side, return air from the room (point 5) is drawn through water media 64b where it is cooled and further humidified before being passed to heat exchanger 62b. Heat released by dehumidification on the process side is transferred to the air stream on the regeneration side. The return air exiting the heat exchanger at point is warmer than the return air at point 6. The relatively warm, dry air at point 7 passes through the regeneration cooler 68 to escape at point 8 as cooler than the ambient air. The cooler air impinges upon regeneration side of housing 60b, triggering the gel sorbent to collapse, releasing the liquid entrained in the sorbent to the atmosphere.

The gel sorbents described herein operate as vapor-liquid-liquid extraction systems under conditions where the relative humidity is high enough to provide sufficient vapor so that the gel sorbent will absorb vapor and swell. The relative humidity at which this will occur will necessarily vary over a wide range, depending upon the gel sorbent used. Therefore, an operational definition of "high relative humidity" is that relative humidity at which the gel sorbent will swell. Conversely, an operational definition of "low relative humidity" is that relative humidity at which the gel sorbent fails to sorb enough vapor to swell. At high relative humidities, the vapor extraction system of the invention will have significant advantages as compared to conventional desiccant systems.

Nevertheless, the gel sorbents described herein will also function under conditions of low relative humidity. Under these circumstances, the gel sorbents will behave as conventional vapor-liquid-vapor desiccants (see FIG. 1). At low relative humidity, there is not enough vapor to cause gel swelling and deliquescence. The vapor will primarily adsorb to the surface of the gel sorbent. The adsorbed liquid is amenable to vaporization at high temperatures in a conventional way. The gel sorbents of the invention thus function throughout a wide range of relative humidities (RH). At high RH, a vapor-liquid-liquid cycle may be imposed, as described in this application.

When the sorbents are exposed to low RH, perhaps because the environment has changed, the sorbents can be made to undergo a conventional vapor-liquid-vapor desiccant cycle. For example, a humidity sensor would directly measure RH or a photoelectric cell could, for instance, sense when a gel sorbent fails to expand beyond a certain point, thus indicating a lowering of RH. A signal could be sent to initiate direct vaporization of liquid from the sorbent.

A dual functioning apparatus (i.e., capable of operating at high and low RH) may include a housing that rotates between two positions; from a sorptive position at one environmental condition into a regeneration position at a second environmental condition. By way of an example, in a high humidity situation the temperature of the phase-transition collapse (i.e., regeneration) region can be about 40 degrees C. and in a low humidity situation, the vaporization temperature can be about 150 degrees C. A housing may rotate through three positions: one to allow sorption; one fixed at an appropriate phase-transition collapse temperature (for example, about 40 degrees C.); and one fixed at a liquid vaporization temperature (for example, about 150 degrees C.).

The economic value of this dual system is: (1) minimal operating cost when the optimal (phase-transition) system is operative; and (2) minimal capital cost because (a) there is only one system and (b) the maximum energy input is always substantially less.

The gel sorbent vapor extraction apparatus and methodology described herein is well suited for use in any enclosed environment having a high vapor content where energy efficiency is particularly desirable (e.g. space capsules, electric automobiles, and sailing vessels). The vapor extraction of the invention may also be used with advantage in industrial drying processes and in environments such as the desert conditions to produce liquid water from water vapor or in marine/moist environments to produce liquid water from fog.

The present invention will now be illustrated by the following examples which are not intended to limit the invention.

EXAMPLE 1

Solvent, Temperature and Electric Field Effects on a Gel Sorbent

A gel is prepared from acrylamide monomers and bisacrylamide monomers that are dissolved in water in a container. Thereafter a polymerization initiator such as ammonium persulfate and TEMED (tetramethyl-ethylenediamine) is added to the solution. First, a reaction between ammonium persulfate and TEMED occurs which produces free radical electrons on the TEMED molecules. These molecules of TEMED associated with free radicals are the nuclei of the polymerization. The free radicals on the TEMED molecule attack and open one of the double-bonded carbon atoms of the acrylamide and bisacrylamide monomers. One electron of the acrylamide or bisacrylamide double bond pairs with the odd electron of the free radical to form a bond between the free radical and this carbon atom; the remaining electron of the double bond shifts to the other carbon atom, which then becomes a free radical. In this way, the active center shifts uniquely to the newly added monomer, which then becomes capable of adding another monomer. The acrylamide monomers, having one double bond are therefore polymerized into a linear chain. The bisacrylamide molecule, consisting of two connected acrylamide molecules have two double bonds, serves as a crosslinker. This chain reaction continues until a network consisting of practically an infinite number of bonded monomers is formed. Both polymerization and crosslinking take place almost instantaneously when the first free radical appears.

The gels are then taken out of the container. With syringe and needle, the gel is be carefully separated from the container wall by forcing water between the gel and the wall.

Each gel sample is then soaked in water so that all the residual acrylamide, bisacrylamide monomers and the initiators are washed away. The gels are then immersed in a basic solution of TEMED (4% in volume) having pH of 12 for time periods of up to 60 days. During this immersion period the acrylamide groups of the network, —$COHN_2$ are hydrolyzed into carboxyl groups, —COOH, a quarter of which are automatically ionized into carboxyl ions, —$COO^-$, and hydrogen ions, H+. The polymer network becomes negatively charged with positive hydrogen ions (H+) in the interstitial space. The longer the immersion time, the more charged the polymer network becomes. By this procedure, gel samples having different degrees of ionization can be prepared.

After hydrolysis, the gels are washed in water. At this final stage of sample preparation, the gel is swollen when in contact with water. A fully hydrolyzed gel, for example, swells 30 times from its original volume. Each gel sample then is immersed in a large volume of a solvent such as acetone, acetone and water mixture, ethanol and water, or methanol and water. For example, when using a mixture of acetone and water, the water inside the polymer network and the acetone-water mixture outside the polymer network are exchanged within 30 minutes by diffusion. Depending on the acetone concentration, some of the gels shrink. The degree of swelling is a function of acetone concentration at room temperature. See FIG. 1 of Tanaka, U.S. Pat. No. 5,100,933, the contents of which are incorporated herein by reference.

The gel-volume collapse is also observed when the temperature is varied at a fixed acetone concentration. See FIG. 2 of Tanaka, U.S. Pat. No. 5,100,933, Supra. For example, the swelling ratio curve of a gel sorbent (hydrolyzed for 8 days) immersed in the mixture of 42% acetone concentration is such that at temperatures higher than room temperature, the gel sorbent swells, and at temperatures below room temperature, the gel sorbent shrinks. There is a discontinuous phase-transition at room temperature.

Figure 7:
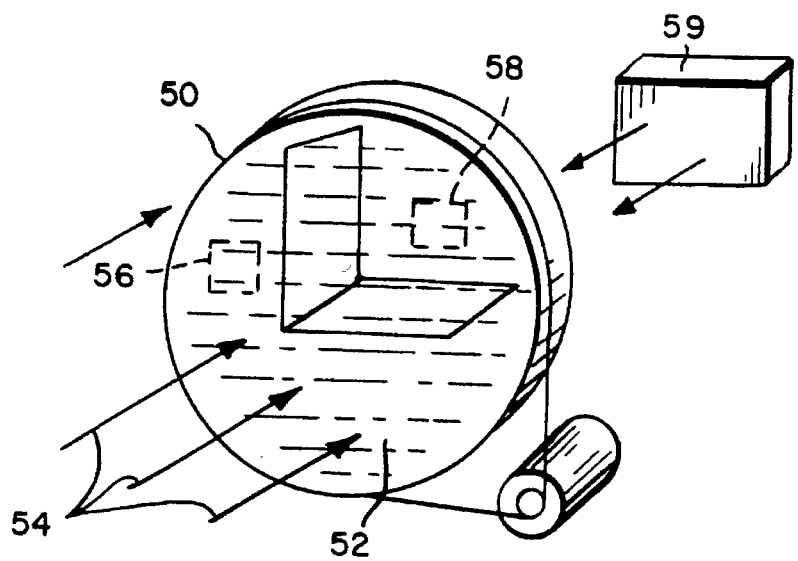
FIG. 7 is a schematic illustration of a third embodiment of an apparatus of the invention.
Figure 8:
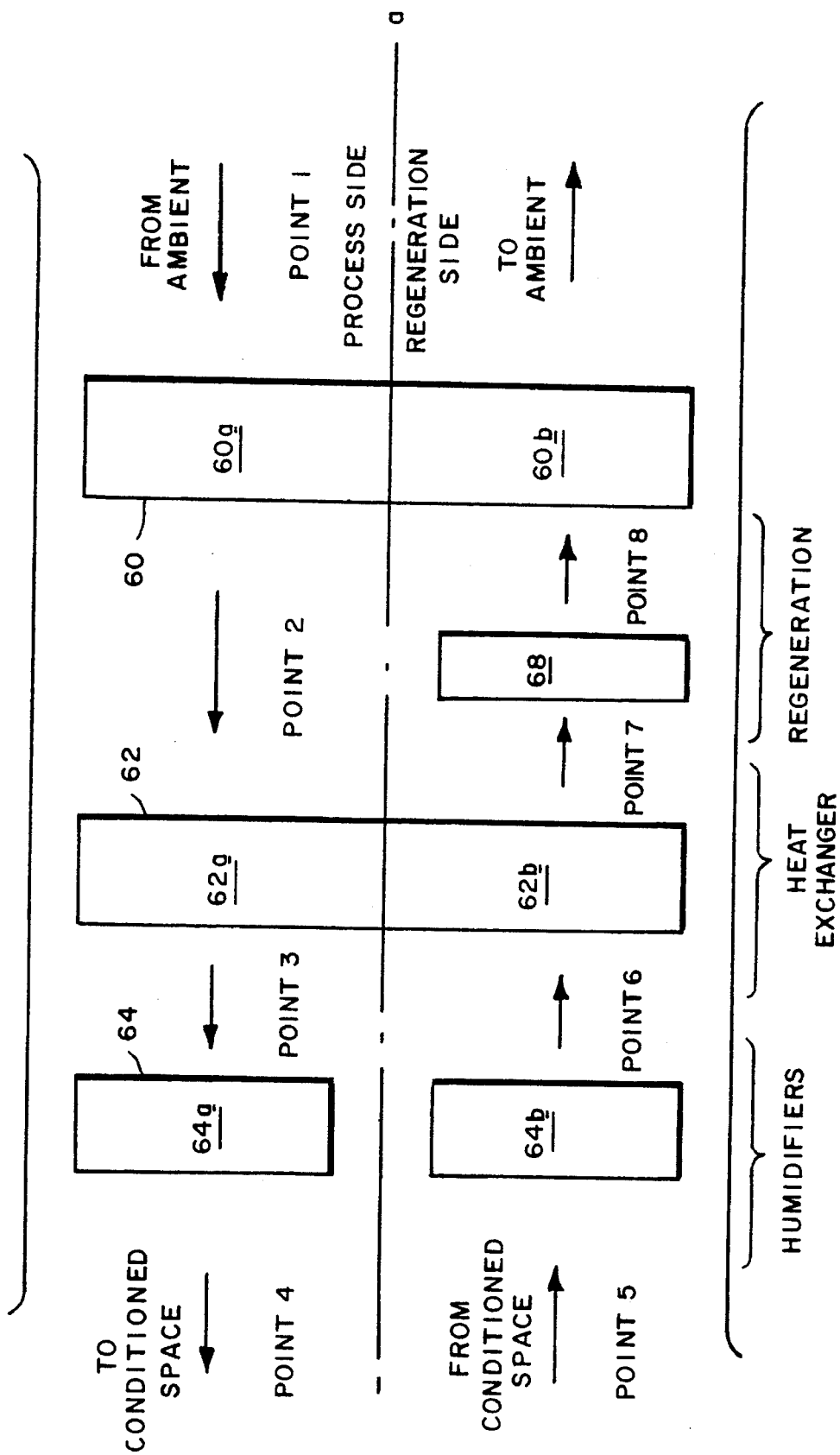
FIG. 8 is a schematic illustration of a gel sorbent-based air conditioner.

Finally, the transition can be induced by applying an electric field across the gel in a 50% acetone-water mixture. When current flows between an anode and cathode, a gel sorbent cylinder disposed between the anode and cathode contracts. When an electric field (~0.5 Volts/cm) is applied across the electrodes, the negative charges on the polymer network are pulled toward the positive electrode. This produces an osmotic pressure gradient along the electric field. The osmotic pressure is strongest on the gel end at the positive electrode and zero at the other end of the gel. There is critical pressure above which the gel collapses and below which is it swollen. The gel, therefore, has a bottle shape as shown in FIGS. 7 and 8 of Tanaka, U.S. Pat. No. 5,100,933, supra. The swollen portion becomes shorter as the electric field becomes stronger. The collapsed part swells again when the electric field is turned off.

EXAMPLE 2

Vapor-Liquid-Liquid Extraction Cycles of a NIPA Gel

Gel Formulation: A pre-gel solution was made with 7.8 g N-isopropylacrylamide (NIPA), 0.133 g methylenebisacrylamide (BIS), and 240 ul tetramethylethylenediamine (TEMED) in 100 ml deionized water. The oxygen in solution was removed by degassing under vacuum. About 40mg ammonium persulfate was added to the solution as an initiator and micropipetttes (with about 200 um bores) were put into the final solution so that a gel string was formed inside the micropipette. Gelation was allowed to take place over a 12 hour period at room temperature.

Pipettes were fractured to expose short sections of NIPA gel string with both ends of the gel supported by sections of micropipette tubing. The NIPA string was mounted in an airspace of a small, clear capsule (about 5cm×4cm×2cm), and a similar NIPA gel was mounted in a water-filled region of the capsule immediately below the air space. The capsule was submerged in a well stirred, temperature controlled bath.

At equilibrium, the air within the sealed capsule is saturated with vapor at the water temperature. A differential thermocouple arrangement permitted the monitoring of temperature differences between water and air within the capsule to about 0.005 deg. C. Water temperature within the capsule was measured to about 0.1 deg. C. with a digital thermocouple (mfg. by Cole-Parmer Scanning Thermocouple Thermometer #92800-00). The diameter of the gel string was observed and recorded through the optically clear walls of the capsule using a 70X microscope with an associated 35 mm camera. Volumetric ratio changes of the gel with temperature were determined by cubing the ratio of the gel string diameter to pipette bore, as scaled in arbitrary length units from photographic prints.

The bath temperature was changed a few degrees and maintained to let the gel reach thermal equilibrium. Then, the gel strings were photographed and temperature recorded. Rarely did capsule air and water temperatures differ by more than 0.005 deg. C. during the experiments. Originally, the gel string held an excess of water due to the gel formation process. To remove this water, the temperature was raised over the gel transition temperature (Tc). Excess water was expelled as liquid which clung to the gel string by surface tension. This liquid was removed by circulating dry air through the capsule airspace until visible liquid on the gel string completely disappeared. Then, temperature was lowered; saturated vapor conditions were reestablished; and the gel string was allowed to sorb water vapor. After sorption was complete, as evidenced by cessation of gel swelling, the temperature was raised again until sorbed water was expelled from the collapsing gel as a liquid.

Figure 9:
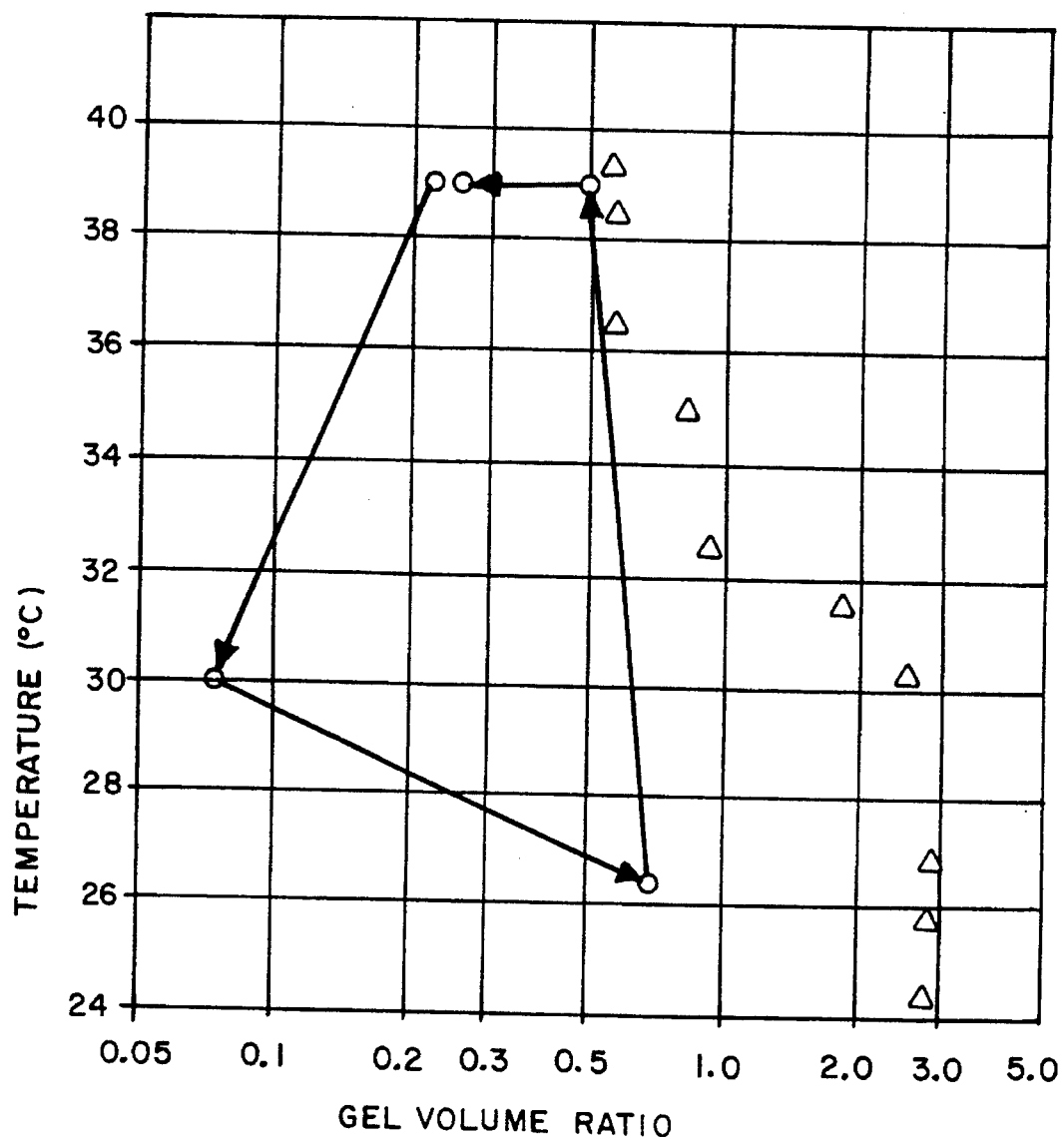
FIG. 9 is a graph showing volume of a NIPA gel string in air (open circles) versus temperature. Also shown is a reference NIPA gel string in water (triangles)

An annotated photographic record of the gel string at significant points on the temperature cycle was developed to confirm liquid release from the gel. FIG. 9 shows these points on a volume versus temperature plot. Also shown is the reference gel string in water.

EXAMPLE 3

Water Absorption Capacity of poly(MAPTAC)

About 44 ml of MAPTAC; methacryloaminopropylmethammonium chloride (as a 50% water solution supplied by Aldrich Chemical Company) was mixed with 56 ml deionized water. Dissolved oxygen was removed by degassing the solution under vacuum. To initiate polymerization of the MAPTAC, 40mg of ammonium persulfate was added. Complete polymerization took place after 12 hours at 60 deg. C. The polymer was dried under vacuum for about two days.

Into the bottom of a glass tube (dimensions 1.25" diameter; 24" long) was placed about 15 ml of a saturated barium chloride solution. The top of the tube was sealed with a stopper. A quartz spring about two inches long (without load) was suspended by one end from the tube and protruded into the head space of the test tube. A round glass pan about 0.5 inches across was suspended from the free end of the quartz spring and about 50 mg of poly(MAPTAC) was added to the pan. The change in length of the spring (delta D) as the polymer absorbed water vapor and gained mass was monitored by a 70X eyepiece. The barium chloride maintained the relative humidity at about 90 percent. The test tube was maintained at room temperature throughout.

Figure 10:
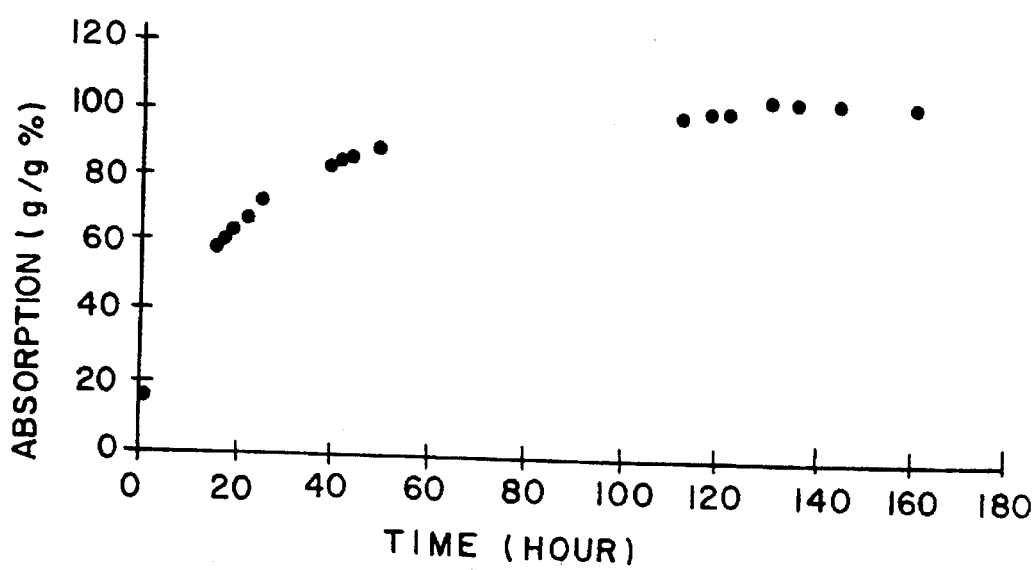
FIG. 10 illustrates vapor absorbency (A) of poly(MAP-TAC) as a function of time in air at 90% relative humidity.

A dry, empty pan was placed on the spring and $D_{pan}$ recorded. Then, poly(MAPTAC) was placed in the pan and the test tube evacuated to dry the polymer. The spring length was measured to determine the length when the polymer was fully dried. $D_{dry}$ was recorded and the barium chloride solution added. The tube was sealed. $D_{wet}$ was recorded as a function of time. Vapor absorbance (A) by poly(MAPTAC) was assayed using the following formula: $(D_{wet}-D_{dry})/(D_{dr}-D_{pan})$. FIG. 10 shows A as a function of time. Maximum absorbance was 104%.

Significantly, poly(MAPTAC) deliquesced at its maximum water absorbance (see table below) and became a poly(MAPTAC) solution. Water absorbency at which deliquescence occurred was also measured at other relative humidities and is presented below in the Table.

| MAPTAC at Rm Temp. | |
|---|---|
| Relative Humidity | Absorbency (%) |
| 53% $(Mg(NO_3)_2)^a$ | 30.7 |
| 58% (NaBr) | 48.1 |
| 69% (KI) | 48.3 |
| 75% (NaCl) | 51.9 |
| 81% $((NH_4)_2SO_4)$ | 58.9 |
| 90% $(BaCl_2)$ | 104.0 |

[a]Saturated solutions of these compounds provide the necessary RH.

EXAMPLE 4

Hydrogen Bonding Effects in a "Reverse" Phase-Transition Gel

This Example illustrates preparation and characteristics of a gel that collapses upon exposure to a decrease in temperature.

Three different gels are formed comprising interpenetrating polymer networks of poly(acrylamide) and poly(acrylic acid). The first gel, Gel 1, is formed without ionization of either polymer in the interpenetrating polymer network. Three percent and six percent respectively, of the acrylic acid groups in the poly(acrylic acid) of Gels 2 and 3 are ionized.

The interpenetrating polymer networks of all three gels are prepared by first preparing three poly(acrylamide) gels. Five grams of acrylamide and 0.133 grams of N,N'-methylenebisacrylamide, commercially available from Bio-Rad Laboratories, and 120 microliters tetramethylenediamine (accelerator), commercially available from Bio-Rad Laboratories, are dissolved in 100 ml of water to form an aqueous solution. One ml of four percent aqueous ammonium persulfate solution (initiator), commercially available from Mallinkrodt is combined with the degassed aqueous solution to form a reaction solution.

The reaction solution is transferred to a glass capillary robe having a length of twenty centimeters and an internal diameter of 0.1 mm. The reaction solution gels in the capillary tube, whereby the monomer and crosslinking agent react to form three poly(acrylamide) gels. Following gelation, the poly(acrylamide) gels are removed from the capillary tubes, washed with water and dried.

Five grams of distilled acrylic acid, 0.133 grams of N,N'methylenebisacrylamide and 40 mg of four percent ammonium persulfate solution are dissolved in 100 ml of water to form an aqueous solution. Three glass capillary tubes having a length of twenty centimeters and an internal diameter of 0.1 mm are filled with the aqueous solution. An amount of sodium hydroxide is added to two of the glass capillaries in an amount sufficient to ionize three percent of the acrylic acid groups in one of the capillary tubes and six percent of the acrylic acid groups in the other capillary tube.

The three dried poly(acrylamide) gels are inserted into the capillary tubes containing the aqueous solutions. The poly(acrylamide) gels are thereby swollen with the aqueous solution of acrylic acid. Radical polymerization is then initiated by raising the temperature of the poly(acrylamide) gels and aqueous solutions to a temperature of about 60° C., thereby forming interpenetrating polymer networks of poly(acrylamide) and poly(acrylic acid). Gel 1 includes poly(acrylic acid) which is not ionized. In Gel 2, the poly(acrylic acid) is three percent ionized. In Gel 3, the poly(acrylic acid) is six percent ionized. The three gels are removed from their respective capillary tubes and washed with water. All three gels are disposed in separate glass micropipettes having an internal diameter of one millimeter.

The size and shape of the gels in the micropipettes are monitored at different temperatures using a Model C1966 AVEC image processor, commercially available from Hammamatsu Photonics, Inc. Each gel is submerged in water in a micropipette. The temperature of the water in the gels is controlled to within 0.01° C. using circulating water at temperatures in the range of between 4° C. and 50° C.

Figure 11:
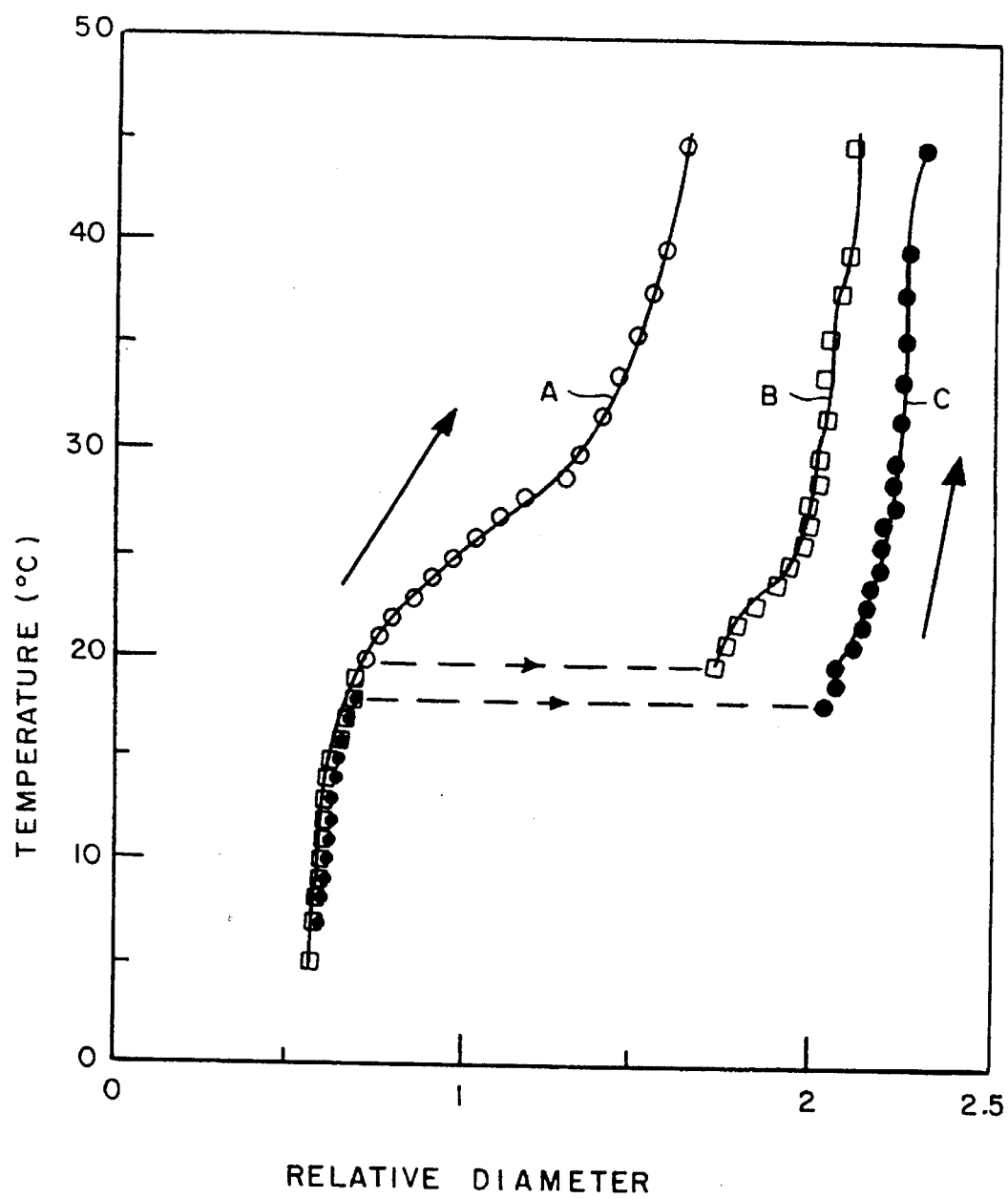
FIG. 11 is a plot of the volume of Gel 1, Gel 2, and Gel 3 relative to their volumes in a contracted phase during expansion of the gels in response to an increase in temperature. Curve A represents the volume of Gel 1. The volume change of Gel 2 and Gel 3, wherein the poly(acrylic acid) has been partially ionized, are represented by Curves B and C, respectively.

FIG. 11 is a plot of the diameters of Gel 1, Gel 2, and Gel 3 relative to their diameters in a contracted phase during expansion of the gels in response to an increase in temperature. Curve A represents the relative diameter of Gel 1. As can be seen in Curve A, Gel 1 exhibits a continuous transition at a temperature in the range of between about 20° C. and 40° C. The changes in Gel 2 and Gel 3, wherein the poly(acrylic acid) has been partially ionized, are represented by Curves B and C, respectively.

As can be seen from Curves B and C, Gel 2 and Gel 3 undergo phase transition during an increase in temperature. Gel 2 expands discontinuously at a temperature of about 18° C. Gel 3 exhibits a significantly large expansion at a temperature of about 20° C. The phase transition is a significantly large expansion of the gels during a rise in temperature of the water in which the gels are submerged.

Also, as can be seen in Curves B and C, Gel 3 exhibits a phase transition at a temperature slightly lower than the phase transition of Gel 2. The temperature at which phase transition occurs therefore decreases with an increasing amount of ionization of the poly(acrylic acid) polymer in the interpenetrating polymer network of the phase-transition gel.

Figure 12:
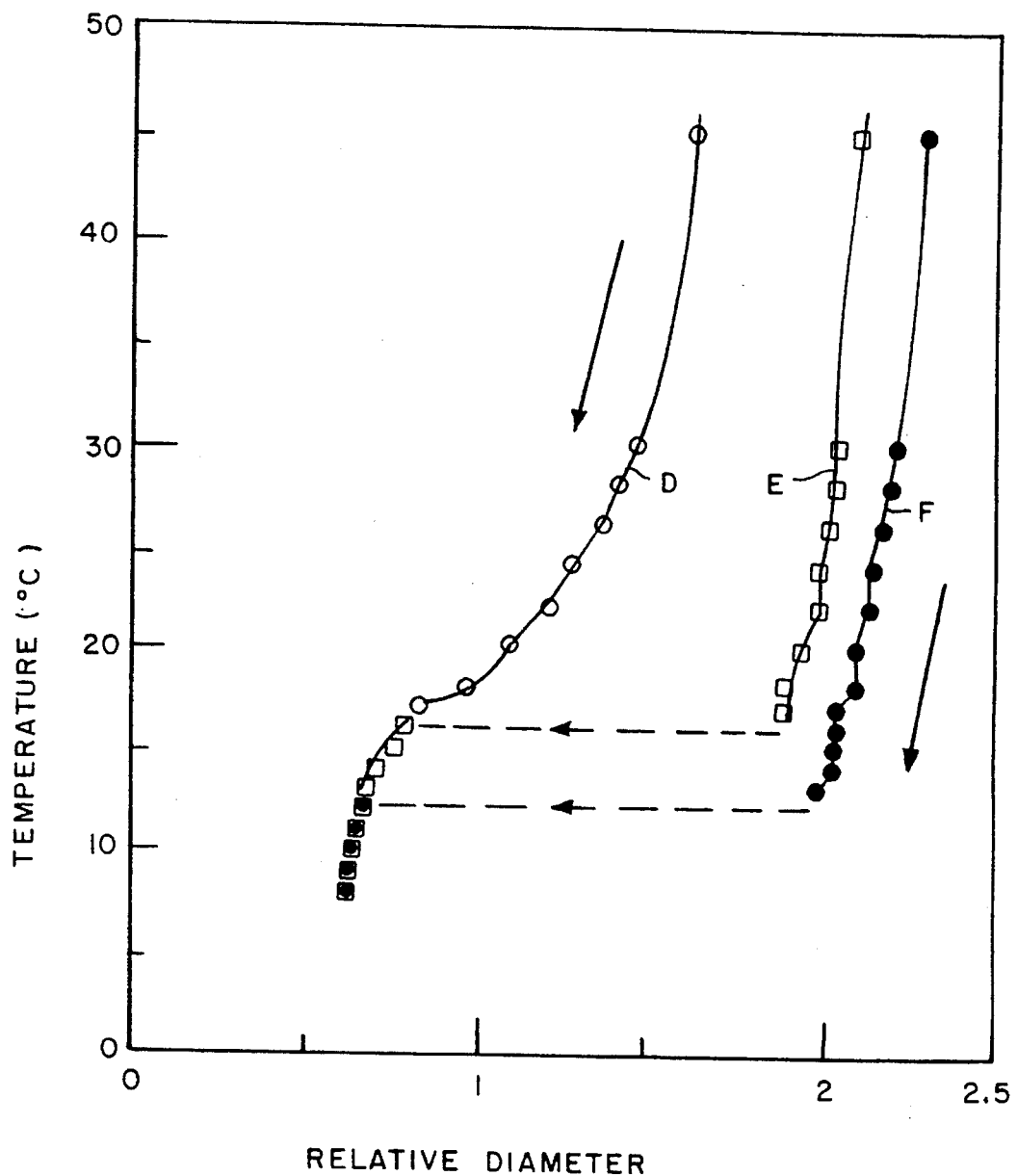
FIG. 12 is a plot of the volume of Gel 1, Gel 2, and Gel 3 during contraction of the gels as the temperature of the water in which the gels are submerged is lowered. Curve D represents the volume change of Gel 1, relative to the volume of Gel 1 in a contracted phase. Curves E and F represent the volume change of Gel 2 and Gel 3, respectively.

FIG. 12 is a plot of the relative diameters of Gel 1, Gel 2, and Gel 3 during contraction of the gels as the temperature of the water in which the gels are submerged is lowered. Gel 1, in which the poly(acrylic acid) polymer is not ionized, exhibits a continuous change in a temperature in the range of between 40° C. and about 20° C. Curve D represents the change of Gel 1, relative to the change of Gel 1 in a contracted phase.

Curves E and F represent the changes in Gel 2 and Gel 3, respectively, during contraction of Gel 2 and Gel 3. Gel 2 exhibits a significantly large contraction at a temperature of about 15° C. Gel 3 exhibits a significantly large contraction at a temperature of about 12° C. As with expansion, the temperature of significantly large contraction decreases with an increasing amount of ionization of the acrylic acid groups of the poly(acrylic acid) in the interpenetrating polymer network of the phase-transition gel.

To confirm the involvement of hydrogen bonding, urea was added and the phase transition studied. Urea is known to disrupt hydrogen bonds. In the presence of 1M urea, a phase transition does not occur—the gels remain swollen over the entire temperature range (dam not shown). We checked that urea did not alter the phase behavior of an acrylic acid/acrylamide copolymer gel, an acrylic acid/N-isopropylacrylamide co-polymer gel, an acrylamide gel or an acrylic acid gel: it affected only the poly(acrylamide)/poly(acrylic acid) interpenetrating polymer network. In this latter system the only attractive force present to induce a transition is hydrogen bonding.

EXAMPLE 5

Light Effects on a Phase-Transition Gel

An N-isopropylacrylamide/[Bis (4-dimethylaminophenyl)-4-vinylphenyl-methaneleucocyanide], copolymerized gel is prepared by a free radical copolymerization in dimethylsulfoxide (DMSO) at 60° C., under a nitrogen atmosphere. The N-isopropylacrylamide is purified by recrystallization from a mixture of petroleum ether and toluene, as a neutral, main constituent, (NIPA, 0.97 g). N,N'-Methylenebisacrylamide, is the crosslinker, (BIS, 0.0003 g). [Bis (4-dimethylaminophenyl)-4-vinylphenyl-methane-leucocyanide] is the photo sensitive molecule (Leucoderivative) and Azo-bis-isobutylonitrile is the photo-initiator, (AIBN, 0.05 g). These materials are dissolved in DMSO, (1.0 g), and purified by distillation under nitrogen atmosphere. The solution is then transferred into a polyethylene tube, having a 1.73 mm inner diameter wherein a gelation reaction is carried out at 60° C. for 4 hours. After the gelation is completed, the 1.73 mm diameter gel is removed from the polyethylene tube, cut into 0.5 to 1 mm thick discs and then immersed in a large amount of deionized, distilled water to wash away residual chemicals and unreacted monomers from the polymer network. Water is repeatedly changed until the diameter of the gel reaches an equilibrium value, which takes approximately a week.

The diameter of the gel, d, is measured by a microscope with a calibrated scale. The swelling ratio of the gel, $V/V_o$, is calculated from the ratio of equilibrium gel diameter to the original diameter, $(d/d_o)$, where $d_o$ was 1.733 mm. The temperature is controlled within 0.04° C. by circulating water during the measurement without ultraviolet irradiation. A GATES MR-4 (wavelength 254 nm) is used for ultraviolet irradiation, and during illumination the temperature is controlled by not only circulating water but also with a thermomodule.

Figure 13:
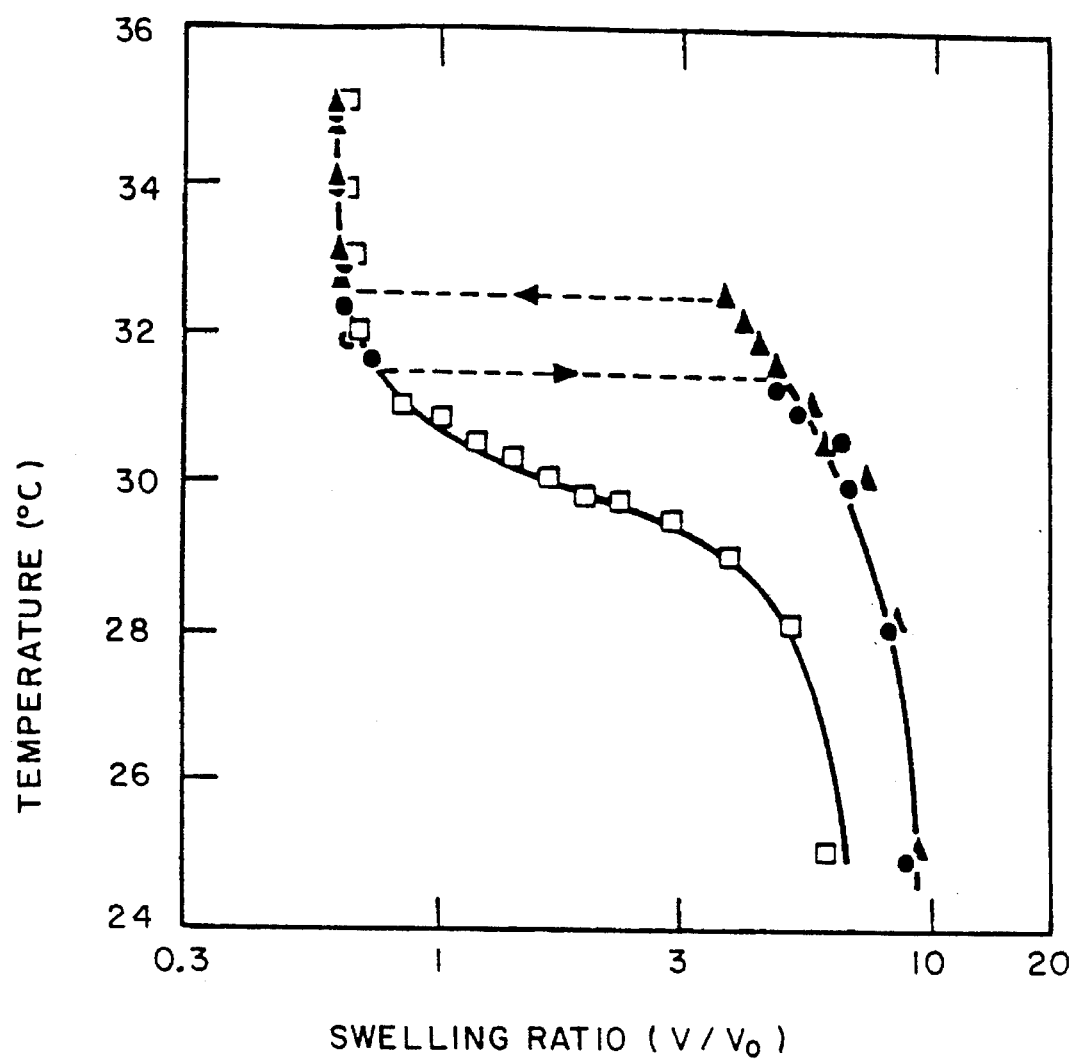
FIG. 13 illustrates swelling curves of a NIPA gel measured with (closed symbols) and without (open symbols) irradiation with ultraviolet light.

Swelling curves of gel measured with and without ultraviolet irradiation are shown in the FIG. 13. When the gel was not irradiated with ultraviolet light (open squares), the NIPA/Leuco derivative copolymer gel underwent a continuous volume change at about 30° C. Without UV irradiation, the triphenylmethane-leuco derivatives cannot produce an ionic state since the condition of the NIPA/Leuco derivative copolymerized gels was the same as the pure, unionized NIPA gel. NIPA/Leuco derivative copolymerized gels exhibit a continuous volume change under irradiation. In addition, the transition temperature becomes lower than that of the gel consisting of only NIPA.

Upon ultraviolet irradiation, the color of the gels changes from pale green to dark green, and the volume change of the gels shows a discontinuous jump. While irradiating the sample with ultraviolet light, the temperature was raised from 25° C. gradually. At 32.6° C., the volume of gels suddenly decreased by approximately ten-fold (closed circles, upper arrow). In contrast, when the temperature was lowered from 35° C., the gel abruptly swelled by about ten-fold (closed circles, lower arrow). When the temperature was fixed at 31.0° C. and the gel exposed to ultraviolet light radiation, the volume of the gel increased about ten-fold (dam not shown).

EXAMPLE 6

Organic Vapor Sorption

This Example illustrates the principle of an organic vapor gel extraction system. The experimental protocol and experimental apparatus are identical to those described above in Example 3 for MAPTAC sorption. The polymer chosen was polystyrene and the organic solvents were acetone, toluene, and ethanol.

Into the bottom of the glass tube was placed about 15 ml of the appropriate organic solvent. The top of the tube was sealed as described above in Example 3 and the percentage absorbance of the polymer was assayed by recording the change in length of the spring. The polystyrene sorbed 6.4% of its weight as ethanol, 56% of its weight as acetone and 367% of its weight as toluene. The sorption of toluene was so large that the polymer deliquesced and became a liquid. The sorptive property of a gel sorbent will depend upon the physical and chemical compatibility of the polymer and the particular solvent.

EXAMPLE 7

Development of Gel Sorbent in a Support Matrix

This Example illustrates creation of a gel sorbent of the invention directly in a supporting matrix of porous cellulose fiber.

The gel sorbent was polyacrylamide and the support matrix was either filter paper or Kimwipe (trademark of Kimberly-Clark). The pregel solution is made by dissolving 5 g acrylamide (Aldrich Chem. Co.O, 0.133 g methylenebisacrylamide (BIS) (Aldrich Chem. Co.), and 240 microliters tetramethylethylenediamine (TEMED, Aldrich) in 100 ml deionized water. After the solution is degassed under vacuum for about 15 minutes to removed dissolved oxygen in the solution, about 40 mg ammonium persulfate (APS, Aldrich) is added as initiator. As soon as the APS is added, a piece of Kimwipe is immersed in the solution and taken out to be placed between two flat glass plates. The gelation reaction was allowed to continue for about 12 hours. The same procedure was repeated using a piece of filter paper.

After gelation, the glass plates are separated and the gel membrane peeled off. This results in a clear gel with the thickness and strength of the original porous cellulose substrate.

EXAMPLE 8

Energy Efficiency Calculations

This Example calculates the energy efficiency and cost required to extract water vapor from a total mass of 100 pounds of air at different relative humidities using different types of dehumidifiers. General formulas and tables for estimating conventional dehumidifier performance and calculating moisture loads can be found in standard reference works such as The Dehumidification Handbook, 2nd edition, ( ed., L. G. Harriman III), Munters Cargocaire (1990), incorporated herein by reference.

CASE A: DEHUMIDIFICATION BY VAPOR COMPRESSION

1. Assume the following airstream values:

Air Input at 55% RH: T=75° F.; water vapor=70 grains/lb dry air; heat capacity=29 BTU/lb dry air Air Input at 90% RH: T=75 ° F.; water vapor=120 grains/lb dry air; heat capacity=37 BTU/lb dry air Air Output: T=50° F.; water vapor=54 grains/lb dry air; heat capacity=20 BTU/lb dry air; and vapor coil=45° F.

2. To remove water from 100 lb of air $Q_{Total}=Q_{Latent}+Q_{Sensible}$ $Q_{Total}$ (BTU) = mass of air (heat$_{in}$ − heat$_{out}$):

| 90% RH | 55% RH |
|---|---|
| (37−20) (100) = 1700 BTU | (29−20) (100) = 900 BTU |

$Q_{Latent}$ (BTU) = mass of air (water$_{in}$ − water$_{out}$)

| 90% RH | 55% RH |
|---|---|
| (120−54)/7000 × 100 = 943 BTU | (70−54)/7000 × 100 = 229 BTU |

3. For a typical vapor compression system operating at a coil temperature of 45° F., the COP is about 3.0

Cooling Energy Input at 90%RH: $Q_{Total}$/COP=1700/3= 567 BTU

Cooling Energy Input at 55%RH: $Q_{Total}$/COP=900/3=300 BTU

Electric Input at 90%RH: 567 BTU/3413 BTU/kwh=0.17 kwh

Electric Input at 55%RH: 300 BTU/3413 BTU/kwh= 0.088 kwh

| At $0.08/kwh = | 90% RH | 55% RH |
|---|---|---|
|  | $0.0133 | $0.0070 |

CASE B: DESICCANT DEHUMIDIFICATION

1. Assume the following airstream values:

Air Input into Desiccant Wheel at 55% RH: See Case A

Air Input into Dessicant Wheel at 90%RH: See Case A

Air Output from Desiccant Wheel: T=94.2° F.; water vapor=54 grains/lb air; (heat carry over):

Cooled Airstream: 75° F.; and 54 grains/lb dry air (vapor compression coil at 60° F.):

2. Carryover heat=$Q_{Latent}$ $Q_{Total}=Q_{Latent}+Q_{Carryover}$ $Q_{Total} = 2\ (Q_{Latent}) = \ 2\ (943) = 1890\ BTU\ \ 2\ (229) = 458\ BTU$ 3. For a typical vapor compression cooler operating at a coil temperature of 60 ° F. the COP is 4.0

Cooling Energy Input at 90%RH=$Q_{Total}$/COP=472 BTU

Cooling Energy Input at 55%RH=$Q_{Total}$/COP=114 BTU

Electric Input at 90% RH=472 BTU/3413=0.1381 kwh

Electric Input at 55% RH=114 BTU/3413=0.0335 kwh

| At $0.08/kwh = | 90% RH | 55% RH |
|---|---|---|
|  | $0.0111 | $0.0027 |

Desiccant Reactivation Energy: $Q_{React}=Q_{Total}$ $Q_{React}$ at 90% RH=1890 BTU=0.00189 mm BTU $Q_{React}$ at 55%RH=457 BTU=0.00045 mm BTU

| Heat cost at $5.00 mm/BTU: | 90% RH | 55% RH |
|---|---|---|
|  | $0.0095 | $0.0023 |
| TOTAL COST: ($ electric + $ reactivation) | $0.0205 | $0.0049 |

CASE C: GEL SORBENT

1. Assume the following airstream values:

Air Input into Gel Sorbent at 90%RH: See Case A

Air Input into Gel Sorbent at 55%RH: See Case A

After Expansion of Gel: T=84.4° F.; water vapor=54 grains/lb dry air;

Air Output after Cooling: 75° F.; and 54 grains/lb dry air (coil at 60° F.):

2. $Q_{Total}=Q_{Latent}-Q_{Carryover}$

Estimation of $Q_{Carryover}$:

a. Assume gel absorbs 50% its weight; 2.0 lb. gel needed per lb of water b. Assume gel has a specific heat of 0.6 BTU lb$^{-1}$ degree F.$^{-1}$ c. Assume gel is 10° F. higher than during contraction phase, then air input temperature:

$Q_{Carryover}$=(2.0 lb. gel)×(0.6 BTU lb$^{-1}$ deg. F.$^{-1}$)×(10° F.)=12 BTU/lb dry air For Cooling: $Q_{Total}=Q_{Latent}+Q_{Carryover}$

|  | 90% RH | 55% RH |
|---|---|---|
| $Q_{Latent}$ = (See Case A) | 943 BTU | 229 BTU |
| $Q_{Total}$ (BTU) = | 943 + 12 = 955 BTU | 229 + 12 = 241 BTU |

3. For a typical vapor compression cooler operating at a coil temperature of 60 ° F. the COP is 4.0

Cooling Energy Input at 90%RH=955 BTU/4=239 BTU

Cooling Energy Input at 55%RH=241 BTU/4=60 BTU

Electric Input at 90%RH=229 BTU/3413=0.07 kwh

Electric Input at 55%RH=60 BTU/3413=0.017 kwh

| At $0.08/kwh | 90% RH | 55% RH |
|---|---|---|
|  | $0.0056 | $0.0014 |

No reactivation cost

CASE D: "REVERSE" GEL SORBENT

1. Assume the following airstream values:

Air Input into Gel Sorbent at 90%RH: See Case A

Air Input into Gel Sorbent at 55%RH: See Case A

After Expansion of Gel: T=84.4° F.; water vapor=54 grains/lb dry air;

Air Output after Cooling: 75° F.; and 54 grains/lb dry air (coil at 60° F.):

2. $Q_{Total}=Q_{Latent}-Q_{Carryover}$

Estimation of $Q_{Carryover}$:

a. Assume gel absorbs 50% its weight; 2.0 lb. gel needed per lb of water b. Assume gel has a specific heat of 0.6 BTU lb$^{-1}$ degree F.$^{-1}$ c. Assume gel is 10° F. LOWER than during contraction phase, then air input temperature:

$Q_{Carryover}$=(2.0 lb. gel)×(0.6 BTU lb$^{-1}$ deg. F.$^{-1}$)×(10° F.)=−12 BTU/lb dry air For Cooling: $Q_{Total}=Q_{Latent}-Q_{Carryover}$

|  | 90% RH | 55% RH |
|---|---|---|
| $Q_{Latent}$ = (See Case A) | 943 BTU | 229 BTU |
| $Q_{Total}$ (BTU) = | 943 − 12 = 931 BTU | 229 − 12 = 217 BTU |

3. For a typical vapor compression cooler operating at a coil temperature of 60 ° F., the COP is 4.0

Cooling Energy Input at 90%RH=931 BTU/4=233 BTU

Cooling Energy Input at 55%RH=217 BTU/4=54 BTU

Electric Input at 90%RH=217 BTU/3413=0.068 kwh

Electric Input at 55%RH=54 BTU/3413=0.016 kwh

| At $0.08/kwh | 90% RH | 55% RH |
|---|---|---|
|  | $0.0054 | $0.0013 |

No reactivation cost

CASE E: DUAL-FUNCTION SYSTEM

Phase-transition gel at high RH (CASE C) and conventional desiccant at low RH (CASE B)

|  | 90% RH | 55% RH |
|---|---|---|
| BTU required per 100 lb air | 247 | 114 |
| Cost per 100 lb air | $0.0056 | $0.0049 |
| Operating Cost Savings per 100 lb air | 90% RH | 55% RH |
| Versus Vapor Compression | $0.0065 | $0.0020 |
| Versus Standard Dehumidification | $0.0148 | no savings |

This means the operating costs of the combined cycle are substantially less at high relative humidity (but the same at low) as either vapor compression and standard desiccant dehumidification.

Equivalents

It should be understood that the preceding is merely a detailed description of certain preferred embodiments. It therefore should be apparent to those skilled in the art that various modifications and equivalents can be made without departing from the spirit or scope of the invention.

We claim:

1. A method of dehumidification of an enclosed space having high water vapor content, comprising the steps of:

providing a gel sorbent to said enclosed space, said gel sorbent capable of sorption of said vapor as liquid when exposed to a first environmental condition selected from the group consisting of temperature, pH, solvent concentration and ion concentration and wherein said gel sorbent is capable of collapsing in a phase-transition and disgorging said liquid as a liquid when exposed to a change in said environmental condition selected from a change in temperature, a change in pH, a change in solvent concentration and a change in ion concentration;

exposing said gel sorbent to conditions within said enclosed space sufficient for said gel sorbent to sorb said vapor as liquid;

exposing said gel sorbent to conditions sufficient for said gel sorbent to undergo a phase-transition and disgorge said liquid as a liquid from inside said gel sorbent; and removing said disgorged liquid from said gel sorbent.

2. A method of extracting vapor from a gas stream, comprising:

providing a gel sorbent that can sorb vapor as liquid when exposed to a first environmental condition selected from the group consisting of temperature, pH, solvent concentration and ion concentration and that can collapse in a phase-transition to disgorge said liquid as a liquid when exposed to a change in said environmental condition selected from a change in temperature, a change pH, a change in solvent concentration and a change in ion concentration;

exposing said gel sorbent to conditions sufficient for said gel sorbent to sorb said vapor as liquid;

exposing said gel sorbent containing said liquid to conditions sufficient for said gel sorbent to undergo a phase-transition and disgorge said liquid as a liquid from inside said gel sorbent; and removing said disgorged liquid from said gel sorbent.

3. The method of claim 2, wherein said step of providing and said first step of exposing comprise providing a moveable housing containing said phase transition gel sorbent and contacting said housing with said first environmental condition sufficient to cause said gel sorbent to sorb said vapor as liquid.

4. The method of claim 3, wherein said second step of exposing comprises exposing said moveable housing to said change in said environmental condition sufficient for said gel sorbent to undergo a phase-transition and disgorge said liquid from said gel sorbent.

5. The method of claim 2, wherein said gel sorbent is contacted with said first environmental condition at a first temperature and exposed to said change in said environmental condition at a second temperature, wherein said second temperature is lower than said first temperature.

6. The method of claim 2, wherein said gel sorbent is contacted with said first environmental condition at a first temperature and exposed to said change in said environmental condition at a second temperature, wherein said second temperature is higher than said first temperature.

7. The method of claim 2, wherein said gel sorbent comprises a network of two or more polymers.

8. The method of claim 7, wherein at least one of said polymers of said gel sorbent exhibits a capacity to absorb at least 50 percent of its weight as liquid.

9. The method of claim 8, wherein said at least one polymer is poly(methacrylamidopropylmethammonium chloride).

10. The method of claim 2, wherein said gel sorbent comprises a network of two polymers forming a polymer network in which a first polymer interpenetrates a second polymer.

11. The method of claim 10, wherein said gel sorbent is adapted to undergo phase transition controlled by hydrogen bonding.

12. The method of claim 10, wherein said first polymer of said gel sorbent includes poly(acrylic acid) and said second polymer includes poly(acrylamide).

13. The method of claim 2, wherein said gel sorbent is contacted with said first environmental condition at a first energy level of electromagnetic radiation and exposed to said change in said environmental condition at a second energy level of electromagnetic radiation.

14. The method of claim 13, wherein said first energy level includes a level of ultraviolet radiation energy and said second energy level includes a different level of ultraviolet radiation energy than said first energy level of ultraviolet radiation energy.

15. The method of claim 14, wherein said gel sorbent includes an N-isopropylacrylamide/[Bis (4-dimethylaminophenyl)-4-vinylphenyl-methane-leucocyanide], copolymerized gel.

16. The method of claim 2, further comprising increasing sorptive capacity of said gel sorbent by applying a static electric field to said gel sorbent sufficient to increase osmotic pressure of said gel sorbent.

17. A method of dehumidification of an enclosed space having high water vapor content, comprising the steps of:

providing a gel sorbent to said enclosed space, said gel sorbent capable of sorption of said vapor as liquid when exposed to a first environmental condition selected from the group consisting of temperature, pH, solvent concentration and ion concentration and wherein said gel sorbent is capable of collapsing in a phase-transition and disgorging said liquid as a liquid when exposed to a change in said environmental condition selected from a change in temperature, a change in pH, a change in solvent concentration and a change in ion concentration; and exposing said gel sorbent to conditions within said enclosed space sufficient for said gel sorbent to sorb said vapor as liquid.

18. A method of extracting vapor from a gas stream, comprising:

providing a gel sorbent that can sorb vapor as liquid when exposed to a first environmental condition selected from the group consisting of temperature, pH, solvent concentration and ion concentration and that can collapse in a phase-transition to disgorge said liquid as a liquid when exposed to a change in said environmental condition selected from a change in temperature, a change in pH, a change in solvent concentration and a change in ion concentration; and exposing said gel sorbent to conditions sufficient for said gel sorbent to sorb said vapor as liquid.

* * * * *

UNITED STATES PATENT AND TRADEMARK OFFICE
CERTIFICATE OF CORRECTION

PATENT NO. : 5,565,139
DATED : October 15, 1996
INVENTOR(S) : Walker et al.

It is certified that error appears in the above-indentified patent and that said Letters Patent is hereby corrected as shown below:

Column 5, line 22: please delete "on"; and insert therefor -- or --.

Column 6, line 6: after "liquid"; insert -- 15 --.

Column 7, line 12: please delete "I-I"; and insert therefor -- H --.

Column 8, line 16: please delete "poly(methacarylamidopropyltrimethylammonium"; and insert therefor -- poly(methacrylamidopropyltrimethylammonium --.

Column 10, line 41: please delete "get:"; and insert therefor -- gel: --.

Column 10, line 50, please delete "$T_o$" in Equation 1; and insert therefor -- $T_c$ --.

Column 11, line 42: please delete "S"; and insert therefor -- $\Delta S$ --.

Column 11, lines 51-52: please delete
"$1/T = \Delta S/\Delta H - 2k/\Delta H/(v_o v_u/\phi^2]\phi/\phi_o)^{1/3} - (f + 1/2)((\phi/\phi_o)] + \ln(1 - \phi) + \phi + \phi^2/2\}$"; and insert therefor --
$1/T = \Delta S/\Delta H - 2k/\Delta H/(v_o v_u/\phi^2[\phi/\phi_o)^{1/3} - (f + 1/2)((\phi/\phi_o)] + \ln(1 - \phi) + \phi + \phi^2/2\}$ --.

Column 15, line 52: please delete "0.5 min."; and insert therefor -- 0.5 mm.--.

Column 16, line 66: after "media"; please delete -- process --.

Column 16, line 66: after "the process"; please insert -- 64a --.

Column 16, line 67: please delete "64B"; and insert therefor -- 64b --.

Column 21, line 64: please delete "robe"; and insert therefor -- tube --.

UNITED STATES PATENT AND TRADEMARK OFFICE
CERTIFICATE OF CORRECTION

PATENT NO. : 5,565,139
DATED : October 15, 1996
INVENTOR(S) : Walker et al.

It is certified that error appears in the above-indentified patent and that said Letters Patent is hereby corrected as shown below:

Column 24, line 14: please delete "dam"; and insert therefor -- data --.

Column 26, line 42: please delete "gel)"; and insert therefor -- gel lb. water$^{-1}$) --.

Column 26, line 43: please delete "dry air"; and insert therefor -- water --.

Column 27, line 15: please delete "gel)"; and insert therefor -- gel lb. water$^{-1}$) --.

Column 27, line 16: please delete "dry air"; and insert therefor -- water --.

Column 28, line 33 (claim 2): before "pH"; please insert -- in --.

Signed and Sealed this

Thirteenth Day of May, 1997

*Attest:*

BRUCE LEHMAN

*Attesting Officer*   Commissioner of Patents and Trademarks